(12) United States Patent
Iwasaki

(10) Patent No.: US 7,266,278 B2
(45) Date of Patent: Sep. 4, 2007

(54) COMMUNICATION SYSTEM USING SHEET-SHAPED LIGHT GUIDE

(75) Inventor: Osamu Iwasaki, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 122 days.

(21) Appl. No.: 11/043,925

(22) Filed: Jan. 28, 2005

(65) Prior Publication Data

US 2005/0162863 A1   Jul. 28, 2005

(30) Foreign Application Priority Data

Jan. 28, 2004   (JP)   ............................. 2004-019971

(51) Int. Cl.
*G02B 6/10*   (2006.01)
(52) U.S. Cl. ........................ 385/129; 385/49
(58) Field of Classification Search ................. 385/43, 385/46, 49
See application file for complete search history.

(56) References Cited

U.S. PATENT DOCUMENTS

| | | | |
|---|---|---|---|
| 3,994,559 A * | 11/1976 | Crow et al. .................... 385/49 |
| 4,213,670 A * | 7/1980 | Milton et al. ................... 385/46 |
| 4,362,357 A * | 12/1982 | Stockmann et al. ........... 385/46 |
| 4,449,783 A * | 5/1984 | Witte ............................. 385/46 |
| 4,484,794 A * | 11/1984 | Witte ............................. 385/46 |
| 4,950,045 A * | 8/1990 | Bricheno et al. ............. 385/24 |
| 5,140,651 A * | 8/1992 | Soref et al. ..................... 385/2 |
| 5,332,690 A * | 7/1994 | Cho et al. ..................... 438/31 |
| 5,542,017 A | 7/1996 | Koike |
| 5,548,670 A | 8/1996 | Koike |
| 5,570,442 A * | 10/1996 | Arii et al. ..................... 385/46 |
| 5,822,475 A | 10/1998 | Hirota et al. |

FOREIGN PATENT DOCUMENTS

| | | | |
|---|---|---|---|
| EP | 1396744 A2 * | 3/2004 |
| EP | 1 443 348 A2 | 8/2004 |
| JP | 11-31035 A | 2/1999 |

OTHER PUBLICATIONS

"High-Uniformity Star Coupler Using Diffused Light Transmission" IEICE Trans. Electron, vol. E84C, No. 3 Mar. 2001 p. 339.

* cited by examiner

*Primary Examiner*—Sung Pak
(74) *Attorney, Agent, or Firm*—Sughrue Mion, PLLC

(57) ABSTRACT

In a communication system using a sheet-shaped light guide (91), which includes particles for scattering light in a sheet-shaped optical medium and propagates signal light incident from one end face of the sheet-shaped light guide to the other end face side while scattering the signal light by the particles, when the sheet-shaped light guide (91) is connected with optical fibers (21 to 24, and 31 to 34) the diameters of which are larger than the thickness of the light guide, the optical fibers (21 to 24, and 31 to 34) and the sheet-shaped light guide (91) are joined with tapered light guides (92) interposed therebetween, the tapered light guide becoming thinner from the optical fiber side thereof to the sheet-shaped light side thereof.

20 Claims, 26 Drawing Sheets

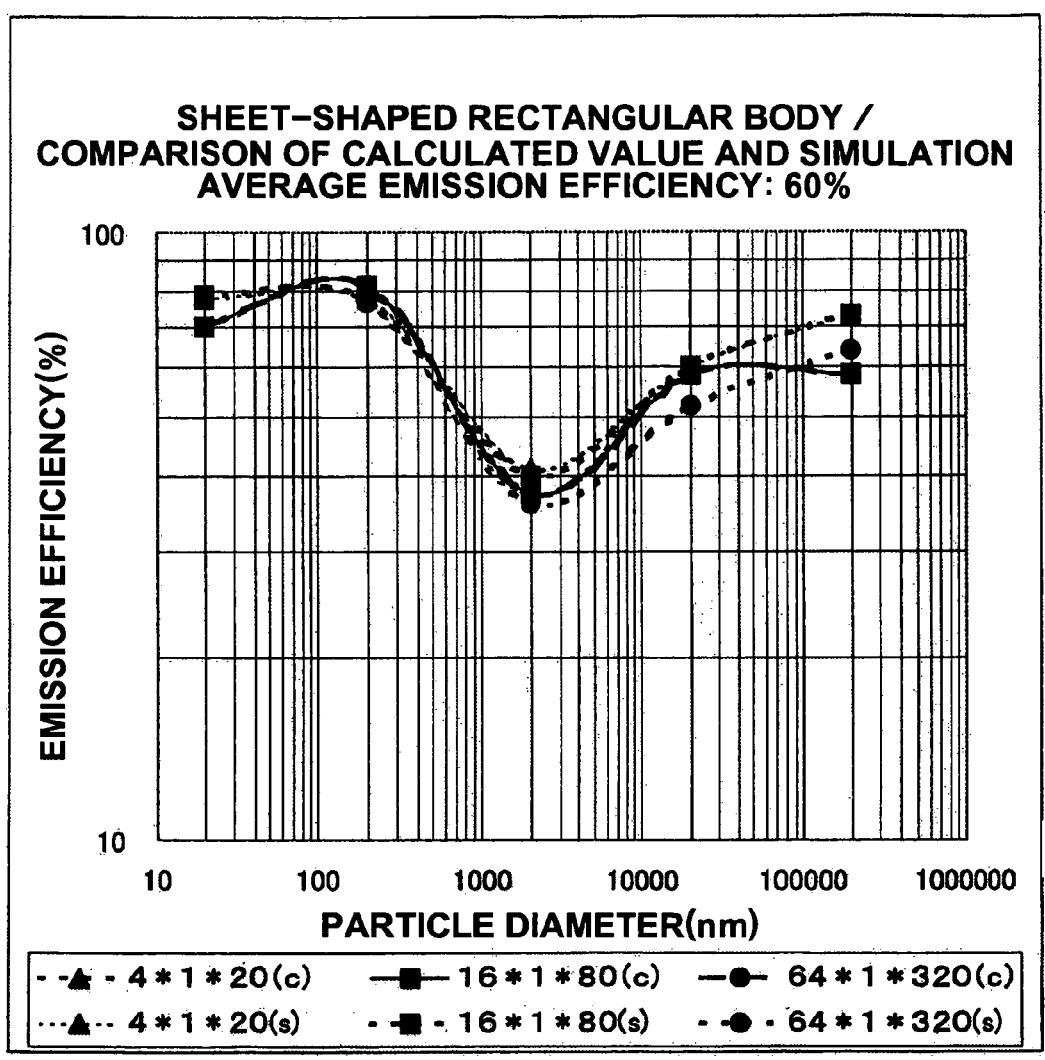

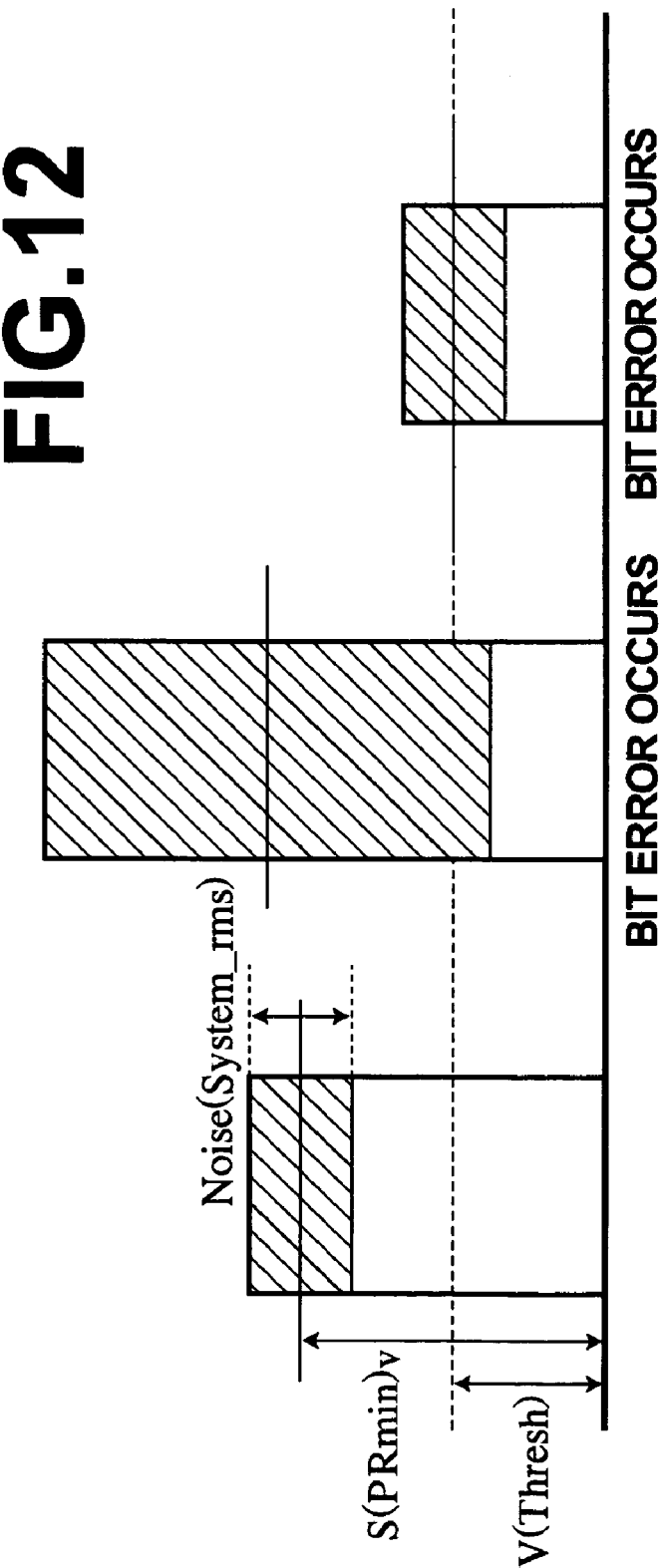

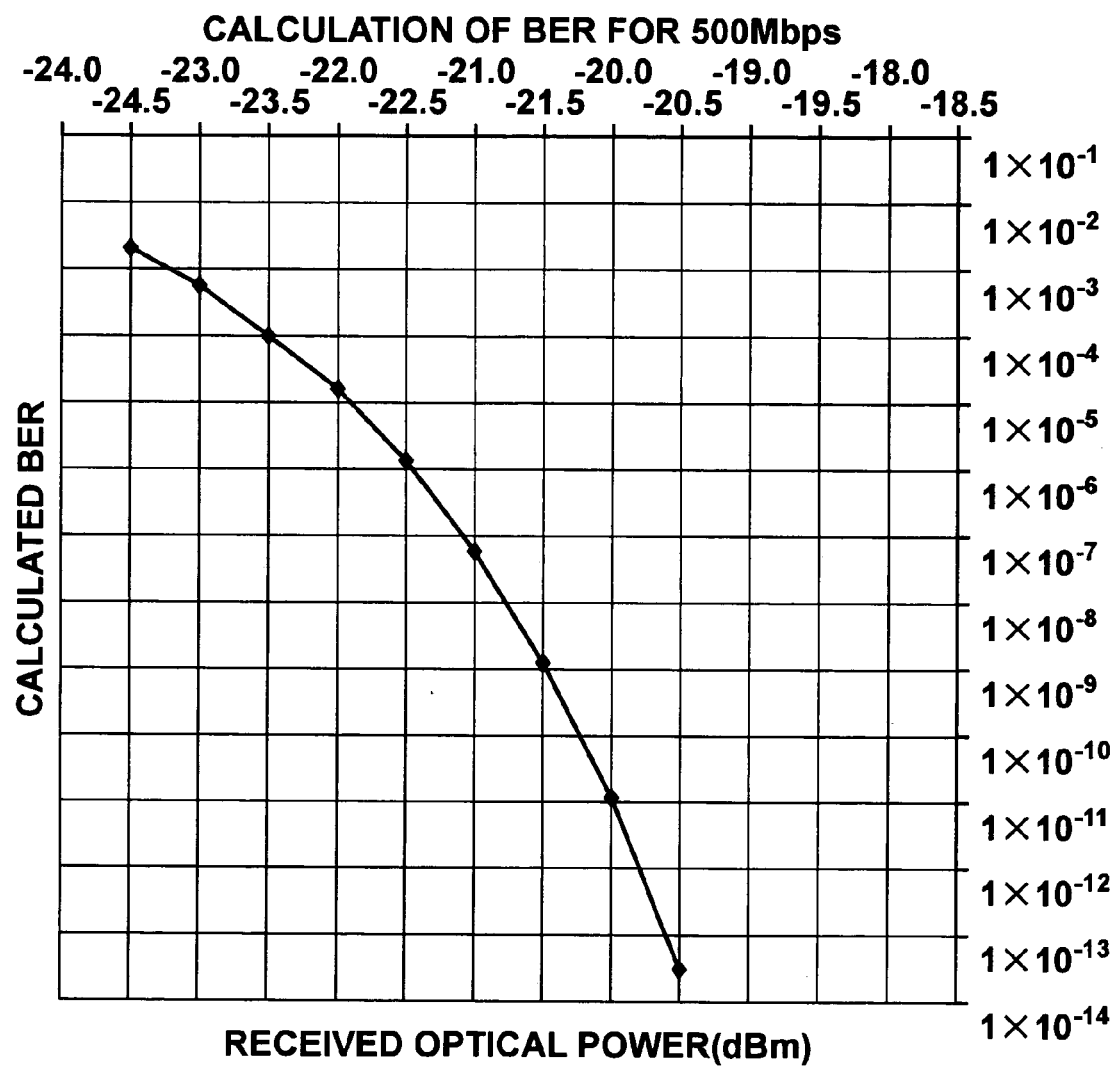

COMMUNICATION SYSTEM USING SHEET-SHAPED LIGHT GUIDE

BACKGROUND OF THE INVENTION

1. Field of the Invention

The present invention relates to a light guide, and particularly to a communication system using a sheet-shaped light guide which includes particles for scattering light in a sheet-shaped optical medium and propagates light incident from one end face of the light guide to the other end face side thereof while scattering the light by means of the particles.

2. Description of the Related Art

Heretofore, as described in, for example, U.S. Pat. Nos. 5,548,670 and 5,542,017, a light guide which includes particles for scattering light in an optical medium, such as PMMA (poly-methyl methacrylate), and which propagates light incident from one end face thereof to the other end face side thereof while scattering the light by means of the particles, is known.

Such a light guide propagates light by using the effect of total reflection at the interface between the side face of the light guide and a surrounding medium (air or cladding layer) while repeatedly scattering the light by means of the particles in the optical medium. Accordingly, when compared to a light guide which propagates light only by using the effect of total reflection, such a light guide has an advantage that it is possible to allow light, the intensity distribution of which is made even, to be emitted from an exit end face. As for this kind of a light guide, as described in, for example, U.S. Pat. No. 5,822,475, by utilizing such an advantage, it is conceived to apply the light guide in order to constitute an optical data bus (sheet bus). The optical data bus is formed by use of a sheet-shaped optical medium. One input part for inputting optical signals is coupled to one end face of the sheet-shaped optical medium, and a plurality of output parts are coupled to the other end face thereof. Therefore, the optical data bus distributes an inputted optical signal as a common signal to the plurality of output parts.

Moreover, as an optical data bus of this type, as described in, for example, Japanese Unexamined Patent Publication No. 11(1999)-031035, that in which light diffusion portions are provided on a light-incident-side end portion of the sheet-shaped optical medium so as to correspond to respective signal light incident portions, and the signal light, which is diffused and branched by the light diffusion portions, is propagated toward a light-exit-side end portion of the optical medium, is also known.

A communication system using a sheet-shaped light guide, which includes particles for scattering light in a sheet-shaped optical medium as described in U.S. Pat. No. 5,822,475, may be installed in various apparatuses. For this purpose, the sheet-shaped light guide must be bent in many cases. However, the sheet-shaped light guide generally has a certain thickness, and is not highly flexible. Therefore, when the space in the apparatus is narrow or has an intricate shape, in some cases, it is impossible to dispose the bent sheet-shaped light guide within the apparatuses. This can be a serious problem when the electrically wired communication system in various apparatuses is replaced by a communication system using the sheet-shaped light guide.

Additionally, such a sheet-shaped light guide as described above is often used by connecting the light guide to optical fibers. However, when a sheet-shaped light guide which has a relatively large thickness to fit the outer diameters of the optical fibers is applied thereto, the above problem becomes more serious because the sheet-shaped light guide becomes particularly hard to bend.

SUMMARY OF THE INVENTION

The present invention has been developed in consideration of the above circumstances. An object of the present invention is to provide a communication system using a sheet-shaped light guide, which can be easily disposed in a narrow and intricate space.

A communication system using a sheet-shaped light guide according to the present invention, which, as described above, includes particles for scattering light in a sheet-shaped optical medium and propagates signal light incident from one end face of the sheet-shaped light guide to the other end face side thereof while scattering the light by means of the particles, is characterized in that the sheet-shaped light guide is connected with an optical fiber, the outside diameter of which is larger than the thickness of the sheet-shaped light guide, and the optical fiber and the sheet-shaped light guide are joined to each other with a tapered light guide interposed therebetween, the tapered light guide becoming thinner from the optical fiber side thereof to the sheet-shaped light side thereof.

It is desirable that the thickness of the tapered light guide at the side on which the tapered light guide is joined to the sheet-shaped light guide and the thickness thereof at the side on which the tapered light guide is joined to the optical fiber be substantially equal to the thickness of the sheet-shaped light guide and the outside diameter of the optical fiber, respectively.

The above described tapered light guide may be made of the same material as that of the sheet-shaped light guide, or may be made of a different material therefrom. Additionally, the tapered light guide may be joined to the sheet-shaped light guide after being formed separately from the sheet-shaped light guide, or may be formed integrally with the sheet-shaped light guide by injection molding or the like from the beginning. Moreover, although the tapered light guide may be made either with or without the light-scattering particles included, in terms of making the intensity distribution of the emitted light even, it is of course desirable that the particles are included therein.

In addition, in the communication system using the sheet-shaped light guide according to the present invention, it is desirable that, when a scattering cross section of the particles is $\Phi$, a length of the optical medium in a light propagation direction is $L_G$, particle density is Np, and a correction coefficient is $K_C$, a value of $\Phi \cdot Np \cdot L_G \cdot K_C$ be 0.9 or less.

In addition, in the communication system using the sheet-shaped light guide according to the present invention, it is desirable that, when rms (root mean square) noise of the system is Noise(System_rms), an acceptable bit error rate is BER(accept), and a probability of occurrence of the Noise (System_rms) is Pr(Noise(System_rms)), the communication system satisfies:

$$Pr(\text{Noise(System\_rms)} \cdot Q) \leq BER(\text{accept})$$

where Q is a proportionality constant.

Moreover, in the communication system using the sheet-shaped light guide according to the present invention, it is desirable that, when rms noise of the system is Noise (System_rms), an arbitrary threshold value in binarization is V(Thresh), and a signal voltage outputted from a light receiver through a load resistor is S(PRmin)v,
the communication system satisfies:

$$\{S(PRmin)v - V(Thresh)\} > Noise(System\_rms) \cdot Q.$$

Moreover, it is desirable that the sheet-shaped light guide used in the present invention be formed of an optical medium of a shape satisfying sin θs>1 when it is assumed that, in the sheet-shaped light guide, light incident thereonto is reflected repeatedly on respective faces other than incident and exit end faces according to Snell's Law, and when a refractive index of a surrounding medium is Ns, a refractive index of the optical medium as a base material is Nm, an incident angle is θm, and a refraction angle is θs, if Nm·sin θm=Ns·sin θs is established when the particles are not included.

Furthermore, it is desirable that the sheet-shaped light guide used in the present invention be formed of an optical medium of a shape satisfying sin θs<1 when it is assumed that, in the sheet-shaped light guide, a light beam emitted from at least one exit end face obeys Snell's Law in reflection and refraction thereof on the exit end face, and when a refractive index of a surrounding medium is Ns, a refractive index of the optical medium as a base material is Nm, an incident angle is θm, and a refraction angle is θs, if Nm·sin θm=Ns·sin θs is established when the particles are not included.

Moreover, in the sheet-shaped light guide used in the present invention, the particles mixed into the optical medium may be non-magnetic conductive particles which behave according to Mie scattering theory. Furthermore, the particles may be mixed into the optical medium with particle density allowed to have a gradient.

Moreover, it is also possible to form the sheet-shaped light guide by combining a plurality of the optical mediums.

The communication system using the sheet-shaped light guide according to the present invention includes the tapered light guide as described above. Accordingly, while a sheet-shaped light guide with small thickness is used, it is possible to join an optical fiber which has a relatively large diameter to the sheet-shaped light guide. Thus, when the relatively thin sheet-shaped light guide can be used, since the sheet-shaped light guide becomes easy to bend, it becomes possible to easily dispose the light guide in a narrow and intricate space in an apparatus.

For this reason, in place of a communication system using a flexible board or a flat cable which has heretofore been used for wiring in a narrow space in an apparatus, for example, the communication system according to the present invention can be widely applied to such a purpose. In addition, this communication system not only can replace the above described conventional system, but also is not susceptible to electro-magnetic noise as it communicates by optical signals. On the other hand, the present communication system is that which can be constructed less expensively compared to a communication system using optical fibers, among systems performing communication by optical signals.

Incidentally, in the above described U.S. Pat. Nos. 5,548,670 and 5,542,017, a light guide for realizing a desired light intensity distribution by means of heterogeneous refractive index structure or by mixing and dispersing dielectric particles into an optical medium is proposed. In U.S. Pat. Nos. 5,548,670 and 5,542,017, it is also described that strengthening scattered light intensity and making light intensity distribution at the exit opening even can be realized by applying Debye's turbidity theory (Journal of Applied Physics Vol. 20 pp. 518-525 (1949)). Debye particularly refers to the discussion about scattered light written in "A theory about thermal fluctuation of a dielectric constant in gas or liquid" (Annalen Der Physik 33 pp. 1275-1298 (1910)) by Einstein. The equation of Einstein described in the above paper is as follows.

$$i/Io = (RT/N) \cdot \{(\epsilon-1)^2(\epsilon+2)^2/P\} \cdot (2\pi/\lambda)^4 \{V/(4\pi D)^2\} \cos^2 \theta \quad (1)$$

i: light intensity at a position apart from a scattering body by a distance of D
Io: incident light intensity
R: gas constant
T: absolute temperature
N: number of molecules in a gram molecule
ε: square of a refractive index at a wavelength of λ (dielectric constant)
P: pressure applied to a fluid
λ: wavelength
V: volume of a light scattering body
D: distance from the light scattering body to an observation point
θ: scattering angle This equation of Einstein is transformed by Debye to be expressed as follows.

$$i/I = <\eta>^2/\epsilon^2 (\pi^2 V/\lambda^4 R^2) \cdot (1+\cos^2 \theta)/2 \cdot \omega \quad (2)$$

i: light intensity at a position apart from a scattering body by a distance of D
Io: incident light intensity
ε: dielectric constant of the scattering body
<η>²: mean square value of dielectric constant fluctuation of the scattering body
R: distance from the observation point to the scattering body
λ: wavelength
V: total volume of the light scattering body
θ: scattering angle
ω: correlation volume $$\omega = 4\pi \int \sin(ksr)/ksr \cdot r^2 \gamma(r) dr \quad (3)$$

k: wave number
s: length of a resultant vector of a unit vector of the incident light and a unit vector of an emitted light (s=2 sin(θ/2))
r: distance between two points in each of which fluctuation of a dielectric constant occurs According to Debye, the correlation volume ω can be integrated by designating correlation function γ(r) as follows:

γ(r)=exp(−r/a) (a: correlation distance)

Thus, equation (3) is expressed as follows:

$$\omega = 8\pi a^3/(1+k^2 s^2 a^2)^2 \quad (4)$$

From equations (2) and (4), the following equation can be obtained.

$$i/I = <\eta>^2/\epsilon^2 (\pi^2 V/\lambda^4 R^2) \cdot (1+\cos^2 \theta)/2 \cdot 8\pi a^3/(1+k^2 s^2 a^2)^2$$

Here, by using s=2 sin(θ/2), equation (2) can be expressed as follows:

$$i/I = 4\pi a^3 <\eta>^2/\epsilon^2 (\pi^2 V/\lambda^4 R^2) \cdot (1+\cos^2 \theta)/(1+8\pi^2(1-\cos \theta)(a/\lambda)^2)^2 \quad (5)$$

The term of the intensity as a function of the scattering angle is expressed as below.

$$f(\theta) = (1+\cos^2 \theta)/(1+8\pi^2(1-\cos \theta)(a/\lambda)^2)^2 \quad (6)$$

The results of the normalized intensity versus scattering angle obtained by calculating this equation (6) with respect to each of typical values of (a/λ), are shown in FIG. 1. Moreover, the results of the normalized intensity versus scattering angle with respect to each of typical values of particle diameters Dp obtained on the basis of the Mie scattering theory, are shown in FIG. 2.

According to the U.S. Pat. Nos. 5,548,670 and 5,542,017, it is conceivable that the particle diameter is approximately equal to the correlation distance. Therefore, from FIG. 1, it can be understood that, when the particle diameter is the same order as the wavelength, the intensity of the forward scatter light is strong, but when the particle diameter exceeds ten times of the wavelength, the side scatter light becomes very strong, and the light does not travel forward anymore. On the other hand, according to the Mie scattering theory, as apparent from FIG. 2, the intensity of the forward scatter light is still strong even when the particle diameter exceeds ten times of the wavelength. It can be found that, with the approximation of γ(r)=exp(−r/a), when the particle diameter is the same order as the wavelength, Debye's turbidity theory gives a result similar to that of the Mie scattering theory, however, as for the particle diameter larger than this, Debye's turbidity theory shows a large disagreement with the Mie scattering theory.

From the above discussion, it is conceivable that the Mie scattering theory is more suitable as a calculation method used for the purpose of causing incident light to be emitted with a homogeneous intensity distribution by mixing particles causing light scattering into a desired optical medium, the Mie's theory representing the Rayleigh scattering when the particle diameter is much smaller than the wavelength, and representing the Huygens-Fresnel diffraction when the particle diameter is much larger than the wavelength. Additionally, since the Mie scattering theory is for one-particle system, it is conceivable that, as for the scattering caused by multi-particles, an analysis in a multi-particle system based on the Mie scattering theory is required.

In manufacturing the sheet-shaped light guide used in the present invention, on the basis of the above discussion, a design condition for realizing desired light emission efficiency can be easily calculated. The method will be described in detail below.

<Scattering Cross Section>

First of all, a description will be given of a scattering cross section Φ. Not only in the Mie scattering theory, the concept of the scattering cross section is widely used in a radiation region such as gamma rays or X rays and in a long wavelength region such as infrared rays or microwave in addition to the visible light region. When the relationship between the particle diameter and the wavelength is in the Rayleigh region, the scattering cross section Φ is expressed as follows:

$$\Phi = 128 \cdot \pi^5 \cdot (a_p^6/3\lambda^4) \cdot \{(n^2-1)/(n^2+2)\}^2 \tag{7}$$

$a_p$: particle radius
λ: incident light wavelength
n: relative refractive index On the other hand, in the Mie's theory, the scattering cross section Φ is expressed by the following equation (8).

$$\Phi = (\lambda^2/2\pi) \sum_{n=1}^{\infty} (2n+1) \cdot [|a_n|^2 + |b_n|^2] \tag{8}$$

λ: incident light wavelength $$a_n = \frac{\varphi_n(\alpha) \cdot \varphi'_n(\beta) - N \cdot \varphi_n(\beta) \cdot \varphi'_n(\alpha)}{\zeta_n(\alpha) \cdot \varphi'_n(\beta) - N \cdot \varphi_n(\beta) \cdot \zeta'_n(\alpha)}$$

$$b_n = \frac{N \cdot \varphi_n(\alpha) \cdot \varphi'_n(\beta) - \varphi_n(\beta) \cdot \varphi'_n(\alpha)}{N \cdot \zeta_n(\alpha) \cdot \varphi'_n(\beta) - \varphi_n(\beta) \cdot \zeta'_n(\alpha)}$$

$\varphi_n(kr) = (\pi kr/2) \cdot J_{n+\frac{1}{2}}(kr)$
  $J_{n+\frac{1}{2}}(kr)$: Bessel function of the first kind
  k: wave number ($2\pi/\lambda$)
  r: radial component in polar coordinates
$\varphi'_n$: derivative of $\varphi_n$
$\zeta_n(kr) = \varphi_n(kr) + i \cdot \chi_n(kr)$
$\chi_n(kr) = -(\pi kr/2) \cdot N_{n+\frac{1}{2}}(kr)$
  $N_{n+\frac{1}{2}}(kr)$: Neumann's Bessel function of the second kind
$\zeta'_n$: derivative of $\zeta_n$
$\alpha = 2\pi a/\lambda$
$\beta = N \cdot \alpha$ In the limit of a/λ>>1 of the above equation (8), the scattering cross section Φ is as follows:

$$\Phi = M\pi a_p^2 \text{ (when converging: } M \approx 2\text{)} \tag{9}$$

Moreover, in a range of $2\pi a_p/\lambda \approx 1$, it is known from equation (8) that the above M oscillates in a range of 1<M<6.

Here, manners in which the M oscillates are shown in FIGS. 3A to 3C, when the relative refractive indexes n are 1.1, 1.5, and 2.1, respectively. From these figures, it can be understood that the scattering cross section Φ in the Mie scattering region oscillates and converges as the particle diameter Dp increases. Even in this oscillation region, the converging value, by which to multiply the geometric scattering cross section $\pi a_p^2$, in the Mie scattering region can be obtained in accordance with the respective particle diameters from FIGS. 3A to 3C across the wide relative-refraction-index n range of 1 to 2.

The results of the relationship between the particle diameter Dp and the scattering cross section Φ, which are obtained with respect to each relative refraction index non the basis of the above equations (7) and (9), are shown in FIG. 4. On the other hand, the results of the relationship between the particle diameter Dp in a multi-particle system and the reciprocal of the particle density multiplied by a numerical value, which are obtained by computer simulation on the basis of the Mie scattering theory, are shown in FIG. 5.

It should be noted that, in the computer simulation, it is assumed that light having a finite spread angle is made incident into an optical medium which includes particles therein and which has a cube shape having various sizes of 10 mm cubed to 1000 mm cubed. That is, the incident light and the size of the cube vary similarly. Moreover, the particle diameter Dp is varied in a wide range from the Rayleigh scattering region to the Fresnel diffraction region. Incidentally, it is assumed that the light is emitted in the same direction as that of the incident light from a position opposite to the incident side, and that the light emission efficiency at the light exit end of the cube is about 80%.

From these FIGS. 4 and 5, it can be understood that there is a close relationship between the scattering cross section and the number of particles in the optical medium having a finite size.

<Lambert-Beer Law and Scattering Cross Section>

From the Lambert-Beer law, the transmissivity T given when parallel rays are incident onto an isotropic medium is expressed as follows:

$$T = I/Io = \exp(-\rho \cdot x) \quad (10)$$

x: distance
Io: incident light intensity
I: emitted light intensity
ρ: attenuation constant Assuming that the scattering cross section of a particle is Φ and the number of particles per unit volume included in the medium is Np, the above attenuation constant ρ is thought to be:

$$\rho = \Phi \cdot Np \cdot K_C \quad (11)$$

Here, $K_C$ is a dimensionless correction coefficient which is empirically obtained when light propagates in an optical medium in a finite space.

The parameters generally required to design a light guide are the volume V of an optical medium, the number $N_{PT}$ of mixed particles, and the particle diameter Dp. Next, how the emitted light intensity varies in this case will be discussed.

Here, Np is expressed as $Np = N_{PT}/V$. Moreover, $K_C$ is determined from comparison or analogy between FIGS. 4 and 5, and from some data not illustrated. In the present computation, $K_C = 0.004$ is obtained from FIGS. 4 and 5, and from some data not illustrated. The particle diameter Dp and the scattering cross section Φ are related with each other via equations (7) and (9). Accordingly, assuming that the length of the optical medium in the optical axis direction is $L_G$, the light emission efficiency Eout is given by:

$$Eout = \exp\{-(\Phi \cdot Np \cdot L_G \cdot K_C)\} \quad (13)$$

From equation (13), it is found that the emission efficiency can be made constant by setting $\Phi \cdot Np \cdot L_G = \text{const}$. In other words, this is achieved by changing Np in accordance with $L_G$ which is the length of the optical medium in the optical axis direction.

Furthermore, when expressed by using a loss coefficient $K_L$ which is obtained by aggregating the Fresnel loss, which depends on the shape of the cube, the intensity distribution of the incident light, and the incident angle when no particles exist, internal transmissivity, and the like, the above equation (13) becomes as follows:

$$Eout = \exp\{-(\Phi \cdot Np \cdot L_G \cdot K_C)\} \cdot K_L \quad (14)$$

Specifically, the emission efficiency Eout can be determined from the scattering cross section Φ of a particle, the particle density Np, the length $L_G$ of the optical medium in the light propagation direction, the correction coefficient $K_C$, and the loss coefficient $K_L$. In other words, when a desired light emission efficiency Eout is given, the light emission efficiency Eout is realized by satisfying the above equation (14).

<Fresnel Loss Factor>

Giving attention to a reflectance in the first place, when a p-polarization component is Rp, and an s-polarization component is Rs, the Fresnel loss is expressed as follows:

$$Rp = \tan(\theta i - \theta r)/\tan(\theta i + \theta r) \quad (15a)$$

$$Rs = -\sin(\theta i - \theta r)/\sin(\theta i + \theta r) \quad (15b)$$

θi: incident angle
θr: refraction angle

Therefore, from equations (15a) and (15b), the reflected-light intensity Ir can be expressed as follows:

$$Ir = (Rp^2 + Rs^2)/2 \quad (16)$$

From equation (16), the transmitted-light intensity It can be expressed as follows:

$$It = 1 - Ir \quad (17)$$

Assuming that the transmitted-light intensity in which the intensity distribution of the incident light is considered is denoted by It', equation (17) can be modified as follows:

$$It'(\theta i) = It(\theta i) \cdot D(\theta i) \quad (18)$$

D(θi): intensity distribution function

<Calculation of Fresnel Loss>

When a light beam having an arbitrary spread angle is incident on an optical medium, the Fresnel loss varies in accordance with the arbitrary incident angle θi. Assuming that the maximum incident angle of the light beam is θmax, the Fresnel loss at an interface is expressed as follows:

$$\int_0^{\theta \max} It(\theta i) \cdot D(\theta i) \, d\theta i \bigg/ \int_0^{\theta \max} D(\theta i) \, d\theta i \quad (19)$$

Assuming that the intensity distribution of the incident light is rectangle for the purpose of simplifying the calculation, the above expression (19) becomes as follows:

$$\int_0^{\theta \max} It(\theta i) \, d\theta i \bigg/ \int_0^{\theta \max} d\theta i \quad (20)$$

The results of the Fresnel loss, which are obtained with respect to each of various refraction indexes of the optical mediums on the basis of the expression (20), are shown in FIG. 6. It is noted that the loss is shown by plotting transmissivity on vertical axis. In other words, the transmissivity of 1 represents the loss of 0.

<Calculation of Light Emission Efficiency Including Fresnel Loss>

From FIG. 6, it can be understood that the Fresnel loss remains almost the same when the incident angle is 30 degrees or less, even when the refractive indexes of the optical medium and the surrounding medium are largely different from each other. When the optical medium is a sheet-shaped rectangular body, direction cosines of light beams are conserved in reflection and refraction, and the incident angle and the emission angle are the same when no particles exist. Additionally, when the internal transmissivity can be approximated as Tin≈1, the product of the transmissivity at the incident surface and the transmissivity at the exit surface is the total transmissivity Ttotal. Accordingly, assuming that the refractive index of the optical medium is n=1.5, the total transmissivity becomes Ttotal=0.92.

Therefore, equation (14) becomes as follows:

$$Eout = \exp\{-(\Phi \cdot Np \cdot L_G \cdot K_C)\} \cdot 0.92 \quad (14b)$$

The results of the relationship between the particle diameter and the light emission efficiency, which are obtained by the use of equation (14b), are shown in FIGS. 7A to 7E. Incidentally, when there is an intensity distribution of the incident light, or when the incident angle of the incident light is 30 degrees or more, the Fresnel loss may be obtained by the use of the expressions (19) and (20) and substituted into equation (14b). However, at the exit of the light, it is desirable that the half angle of the spread angle of the incident light be about 30 degrees in consideration of the critical angle.

Regarding FIGS. 7A to 7E, firstly, light emission efficiencies as average targets are determined with respect to each particle diameter. FIGS. 7A to 7E show the results of the calculated values (10 mm(C), 100 mm(C), and 1000 mm(C)) obtained with respect to each particle diameter in the present calculation method and the precise simulations (S 10 mm, S 100 mm, and S1000 mm) performed under the conditions of the particle diameters and the particle densities which are used in the present calculation. The light emission efficiencies as average targets are 80%, 70%, 60%, 50%, and 40% in FIGS. 7A to 7E, respectively. The scattering cross section $\Phi$ was calculated according to the Rayleigh's theory when the particle diameter is 20 nm, and according to the Mie's theory when the particle diameter is 200 nm or more. "S" represents the simulation result, and "C" represents the present calculation result. Additionally, each of the above values is the length $L_G$ of the optical medium in the light propagation direction.

From FIGS. 7A to 7E, it can be understood that, when the light emission efficiencies as average targets are 60% or more, the results of the present calculations fall within errors of less than 10% of the precise simulation results, and well agree with those of the simulations. In other words, FIGS. 7A to 7E show that the errors are less than 10% when the value of $\Phi \cdot Np \cdot L_G \cdot K_C$ is 0.4 or less. Moreover, FIGS. 7A to 7E also show that the errors are less than 50% even when the above-described value is 0.9 or less. Note that, for the value of $K_L$, 0.92 which is an empirically obtained value is used.

In terms of performing a simulation or making a trial production, it is conceived that no particular problem occurs for the purpose of setting the targets for the light emission efficiencies even when the errors of approximately 50% occur. Needless to say, it is not necessary to perform the simulation when the errors are less than 10%. Moreover, it becomes unnecessary to evaluate several kinds of samples and choose therefrom. Accordingly, an effect that development efficiency is improved is obtained.

From the results described above, it is conceived that it is possible to obtain a prospective solution for the light emission efficiency by the use of equation (14) on the basis of the results in the Rayleigh region and the Mie scattering converging region, which are relatively simple, without relying on the complicated theory of the Mie scattering. The present method is created in consideration of this finding, and as described above, the desired light emission efficiency Eout is realized by satisfying the following equation:

$$E\text{out} = \exp\{-(\Phi \cdot Np \cdot L_G \cdot K_C)\} \cdot K_L$$

CALCULATION EXAMPLE

Results of performing the calculation for the sheet-shaped rectangular body on the basis of equation (14) are shown in Tables 1 to 3 and FIGS. 8A to 8C. Note that FIG. 8A shows a graph of numerical values listed in Table 1, and in a similar way, Table 2 and Table 3 are corresponding to FIG. 8B and FIG. 8C, respectively. In the calculation results in these Tables, any of the values of $\Phi \cdot Np \cdot L_G \cdot K_C$ is 0.9 or less. Note that, in any of the cases, the value of $K_L$ is 0.92.

TABLE 1

| | | | | Eout = 0.8 | |
|---|---|---|---|---|---|
| Particle diameter (nm) | Scattering cross section ($m^2$) | Particle density (pieces/$mm^3$) | W × T × $L_G$ (mm) | Emission efficiency, Eq. (14) (%) | Emission efficiency, SIM (%) |
| 20 | $1.1 \times 10^{-22}$ | $1.0 \times 10^{13}$ | 4 × 1 × 20 | 84 | 87 |
| | | $2.5 \times 10^{12}$ | 16 × 1 × 80 | | 88 |
| | | $6.3 \times 10^{11}$ | 64 × 1 × 320 | | 88 |
| 200 | $1.5 \times 10^{-14}$ | $3.0 \times 10^7$ | 4 × 1 × 20 | 89 | 89 |
| | | $7.5 \times 10^6$ | 16 × 1 × 80 | | 89 |
| | | $1.9 \times 10^8$ | 64 × 1 × 320 | | 89 |
| 2,000 | $12.6 \times 10^{-12}$ | $3.0 \times 10^5$ | 4 × 1 × 20 | 68 | 75 |
| | | $7.5 \times 10^4$ | 16 × 1 × 80 | | 76 |
| | | $1.9 \times 10^4$ | 64 × 1 × 320 | | 76 |
| 20,000 | $6.3 \times 10^{-10}$ | $3.0 \times 10^3$ | 4 × 1 × 20 | 79 | 86 |
| | | $7.5 \times 10^2$ | 16 × 1 × 80 | | 86 |
| | | $1.9 \times 10^2$ | 64 × 1 × 320 | | 86 |
| 200,000 | $6.3 \times 10^{-8}$ | $3.0 \times 10^1$ | 4 × 1 × 20 | 79 | 90 |
| | | $7.5 \times 10^0$ | 16 × 1 × 80 | | 90 |
| | | $1.9 \times 10^0$ | 64 × 1 × 320 | | 90 |
| Rectangular body (Sheet) | | | | | |

Note)
SIM: simulation

TABLE 2

Eout = 0.7

| Particle diameter (nm) | Scattering cross section (m²) | Particle density (pieces/mm³) | W × T × L_G (mm) | Emission efficiency, Eq. (14) (%) | Emission efficiency, SIM (%) |
|---|---|---|---|---|---|
| 20 | $1.1 \times 10^{-22}$ | $2.0 \times 10^{13}$ | 4 × 1 × 20 | 78 | 82 |
|  |  | $5.0 \times 10^{13}$ | 16 × 1 × 80 |  | 83 |
|  |  | $1.3 \times 10^{12}$ | 64 × 1 × 320 |  | 83 |
| 200 | $1.5 \times 10^{-14}$ | $6.0 \times 10^{7}$ | 4 × 1 × 20 | 85 | 85 |
|  |  | $1.5 \times 10^{7}$ | 16 × 1 × 80 |  | 85 |
|  |  | $3.8 \times 10^{6}$ | 64 × 1 × 320 |  | 84 |
| 2,000 | $12.6 \times 10^{-12}$ | $4.5 \times 10^{5}$ | 4 × 1 × 20 | 59 | 65 |
|  |  | $1.1 \times 10^{5}$ | 16 × 1 × 80 |  | 65 |
|  |  | $2.8 \times 10^{4}$ | 64 × 1 × 320 |  | 58 |
| 20,000 | $6.3 \times 10^{-10}$ | $4.5 \times 10^{3}$ | 4 × 1 × 20 | 73 | 79 |
|  |  | $1.1 \times 10^{3}$ | 16 × 1 × 80 |  | 79 |
|  |  | $2.8 \times 10^{2}$ | 64 × 1 × 320 |  | 70 |
| 200,000 | $6.3 \times 10^{-8}$ | $4.5 \times 10^{1}$ | 4 × 1 × 20 | 73 | 86 |
|  |  | $1.1 \times 10^{1}$ | 16 × 1 × 80 |  | 86 |
|  |  | $2.8 \times 10^{0}$ | 64 × 1 × 320 |  | 78 |
| Rectangular body (Sheet) |  |  |  |  |  |

Note)
SIM: simulation

TABLE 3

Eout = 0.6

| Particle diameter (nm) | Scattering cross section (m²) | Particle density (pieces/mm³) | W × T × L_G (mm) | Emission efficiency, Eq. (14) (%) | Emission efficiency, SIM (%) |
|---|---|---|---|---|---|
| 20 | $1.1 \times 10^{-22}$ | $3.2 \times 10^{13}$ | 4 × 1 × 20 | 70 | 78 |
|  |  | $8.0 \times 10^{12}$ | 16 × 1 × 80 |  | 79 |
|  |  | $2.0 \times 10^{12}$ | 64 × 1 × 320 |  | 79 |
| 200 | $1.5 \times 10^{-14}$ | $1.2 \times 10^{8}$ | 4 × 1 × 20 | 79 | 78 |
|  |  | $3.0 \times 10^{7}$ | 16 × 1 × 80 |  | 78 |
|  |  | $7.5 \times 10^{6}$ | 64 × 1 × 320 |  | 77 |
| 2,000 | $12.6 \times 10^{-12}$ | $9.0 \times 10^{5}$ | 4 × 1 × 20 | 37 | 41 |
|  |  | $2.3 \times 10^{5}$ | 16 × 1 × 80 |  | 40 |
|  |  | $5.6 \times 10^{4}$ | 64 × 1 × 320 |  | 36 |
| 20,000 | $6.3 \times 10^{-10}$ | $9.0 \times 10^{3}$ | 4 × 1 × 20 | 59 | 60 |
|  |  | $2.3 \times 10^{3}$ | 16 × 1 × 80 |  | 60 |
|  |  | $5.6 \times 10^{2}$ | 64 × 1 × 320 |  | 52 |
| 200,000 | $6.3 \times 10^{-8}$ | $9.0 \times 10^{1}$ | 4 × 1 × 20 | 59 | 73 |
|  |  | $2.3 \times 10^{1}$ | 16 × 1 × 80 |  | 73 |
|  |  | $5.6 \times 10^{0}$ | 64 × 1 × 320 |  | 64 |
| Rectangular body (Sheet) |  |  |  |  |  |

Note)
SIM: simulation

In FIGS. 8A to 8C, lines indicated by reference symbols (C) and (S) represent the results of this calculation and the precise simulation, respectively. Moreover, numerical values represent dimensions (mm) of each optical medium. Furthermore, the light emission efficiencies as the targets are set at the averages in the respective particle diameters. As apparent from Tables 1 to 3 and FIGS. 8A to 8C, it can be understood that the results of this calculation and the results of the simulation well agree with each other. In particular, the results in the particle diameter of 2,000 nm make it far clearer that the present calculation method agrees with the simulation.

<Distribution Characteristics of Emitted Light Intensity>

Distribution characteristics of emitted light intensity are affected by an intensity distribution of the light source, a spread angle, the number and location of the light sources and the like, and were therefore evaluated by the simulation. The distribution characteristics of the emitted light intensity for each particle diameter, which were thus obtained, are shown in FIGS. 9A to 9C. Here, the light source was assumed to be located at a center of an incident-side cross section of the optical medium, and the half angle of the spread angle was set at 30 degrees. FIGS. 9A to 9C show results of performing the simulations for the case of the sheet-shaped rectangular bodies under the same conditions as in Table 1, and show the results of the cases where sheet sizes thereof are small, medium and large, respectively.

From these graphs, it can be understood that substantially even intensity distributions are realized at approximately 90% of the light emission efficiency in the optical medium, cross sections of which are rectangular. From the above discussion and the computer simulation, when the light guide is manufactured by mixing the particles causing the light scattering into the arbitrary optical medium, first, on the basis of equation (14), the light emission efficiency can be chosen in advance from the scattering cross section, the particle density, the dimension of the optical medium and the like with respect to each particle diameter. Furthermore, the light intensity distribution characteristics may be obtained by the precise simulation. Alternatively, it is also possible to make several kinds of samples in accordance with the conditions chosen in advance on the basis of the expression (14), and to experimentally evaluate the samples.

Moreover, in the sheet-shaped light guide used in the present invention, when a configuration satisfying the relationship of $\Phi \cdot Np \cdot L_G \cdot K_C \leq 0.9$ as described above is adopted, the errors from the results of the simulation can be less than 10%. Therefore, good light emission efficiency and an even intensity distribution of the emitted light can be realized.

Moreover, since the sheet-shaped light guide used in the present invention propagates light therethrough while repeatedly scattering the light by the particles in the optical medium, both of the following are possible in a similar way: one is to make the light incident from one end face and to propagate the light to the other end face; and the other is to make the light incident from the above-described other end face and to propagate the light to the above-described one end face. Accordingly, it becomes possible for a communication system using the sheet-shaped light guide of the present invention to perform two-way communication.

<Necessary Condition of Communication System Using Sheet-shaped Light Guide>

A typical sheet-shaped light guide for communication is shown in FIG. 10. As described above, the sheet-shaped light guide 10 includes the light-scattering particles in the optical medium such as, for example, polymethylmethacrylate (PMMA), and propagates light incident from one end face to the other end face while scattering the light by the particles. Moreover, a plurality of optical fibers 21 to 23 are joined to the one end face of the sheet-shaped light guide 10, and optical fibers 31 to 33 are joined to the other end face. Usually, optical fibers having large numerical apertures (N.A.) are employed as the optical fibers 21 to 23 and 31 to 33, thus enabling the two-way communication.

Conditions in the case of receiving light by the optical fibers will be discussed next. According to the paper "High-Uniformity Star Coupler Using Diffused Light Transmission" IEICE TRANS. ELECTRON, Vol. E84C, No. 3 MARCH 2001 p. 339, requirements for a light receiver in a sheet-shaped light guide system for communication are as follows.

<<20.5 dBm (0 dBM=1 mW) or More is Required as Minimum Received Optical Power of Light Receiver>>

This is calculated from a Bit-Error-Rate (BER) in the case of transmitting/receiving a signal of 500 Mbps, and the light receiver is PIN photodiode. Accordingly, this condition is not helpful in the case where the light receiver is different (for example, photomultiplier, avalanche photodiode and the like), or in the case where a transmission band is different. Specifically, in an arbitrary light receiver, the minimum received optical power which is acceptable in a certain transmission band should be present. Thus, the acceptable minimum received optical power of the light receiver, which satisfies the above-described condition, is defined as P(Receiver)min.

First, constraints in the case where the intensity distribution of the light emitted from the sheet-shaped light guide is flat are obtained from the above-described condition. Even when the intensity distribution of the emitted light is flat, in one optical fiber, a cross-section area ratio of $\pi/4$ between the light guide and the optical fiber necessarily lead to a loss, provided that a core diameter of the optical fiber is equal to thickness of the sheet-shaped light guide. Moreover, a tolerance is not considered here.

When the number of branches (number of nodes) is N, the optical power is lowered by a factor of 1/N. Moreover, when $\pi/4$ of the lowered quantity is counted as a loss, the optical power P (Receiver) received by the light receiver in an ideal case is represented as follows:

$$P(\text{Receiver}) = E\text{out} \cdot (1/N) \cdot \pi/4 \quad (21)$$

Here, it is assumed that the light receiver receives all the light emitted from the optical fiber. Thus, when the optical power of the light incident onto the light guide is Pin, equation (21) is modified as follows:

$$P(\text{Receiver}) = P\text{in} \cdot E\text{out} \cdot (1/N) \cdot \pi/4 \quad (22)$$

The optical power received by the light receiver which is represented by dBm by taking a logarithm of this equation (22), is expressed as follows:

$$P(\text{Receiver})_{dBm} = -10 \, \text{Log}\{P\text{in} \cdot E\text{out} \cdot (1/N) \cdot \pi/4\} \quad (23)$$

The relationship between the received optical power and the number of branches (number of nodes) is shown in FIG. 11 for the cases where the incident optical power is 1 mW and 10 mW. As understood from FIG. 11, naturally, the received optical power is proportional to the emitted optical power. Moreover, it is assumed here that the intensity distribution of the light emitted from the sheet-shaped light guide is flat. However, in fact, when the position of the light source is changed, the intensity distribution of the emitted light is also changed. Specifically, it is conceived that fluctuations occur in the received optical power, and the received optical power becomes the minimum at a portion where the intensity of the emitted light is the minimum.

Here, when the optical power Pin incident onto the light guide is given, a distribution profile of the emitted light given when the light source is at an arbitrary position is represented by a normalized intensity distribution function D(x, y), in which a direction along which the intensity distribution of the emitted light has a long side is taken as x, and a direction along which the intensity distribution thereof has a short side is taken as y. Moreover, each of units into which an incident portion or an exit portion is divided by the number of branches (number of nodes) is referred to as a segment, and it is assumed that the center (optical axis) of the optical fiber is ideally positioned at the center of each segment.

Therefore, when Segi is an integration region in an i-th segment, a mean value NPi in which the emitted optical power is normalized in the i-th segment is represented as follows:

$$NPi = \int_{Segi} D(x, y) \, dx \, dy \Big/ \int_{Seg\,max} D(x, y) \, dx \, dy \quad (24)$$

Here, Segmax denotes a segment in which the optical power becomes the maximum among all the segments. Moreover, in a segment in which the optical power becomes the minimum, NPi is represented as follows:

$$NPi(\text{min}) = \int_{Seg\ min} D(x,y)\,dx\,dy \Big/ \int_{Seg\ max} D(x,y)\,dx\,dy \qquad (25)$$

In equation (23), the total emitted optical power Pout is given by the following equation:

$$Pout = Pin \cdot Eout \qquad (26)$$

From this relationship, with regard to the optical power PSegi in the i-th segment, the number of branches, the number of segments and the number of nodes are equal to one another. Accordingly, PSegi is represented as follows.

$$PSegi = Pout \cdot \left\{ NPi \Big/ \sum_{i=1}^{n} NPi \right\} \qquad (27)$$

Note that, in this specification, for the sake of convenience, the following expression included in the above-described equation (27) is described as ΣNPi.

$$\sum_{i=1}^{n} NPi$$

The above-described equations (23) and (27) are combined, and 1/N given in the case where the intensity distribution of the emitted light is flat is replaced. Then, the following equation is established:

$$P(\text{Receiver})_{dBm} = -10\ \text{Log}\{Pin \cdot Eout \cdot (NPi/\Sigma NPi) \cdot \pi/4\}$$

A numerical value necessary here is that given in the case where the optical power emitted from the optical fiber is the minimum, which can be obtained by equation (25). Specifically, when $P(\text{Receiver\_min})_{dBm}$ is the minimum received optical power received by the light receiver, $P(\text{Receiver\_min})_{dBm}$ is expressed as follows:

$$P(\text{Receiver\_min})_{dBm} = -10\ \text{Log}\{Pin \cdot Eout \cdot (NPi(\text{min})/\Sigma NPi) \cdot \pi/4\} \qquad (28)$$

Pin: incident optical power
Eout: light emission efficiency
NPi(min): optical power in a segment in which the optical power becomes minimum
ΣNPi: sum of the optical power of segments Moreover, when the minimum optical power required for the light receiver in order to satisfy a certain BER is $PRmin_{dBm}$, the following relationship is established:

$$PRmin_{dBm} \leq P(\text{Receiver\_min})_{dBm}$$

Furthermore, when a coupling loss between a light emitter and the optical fiber is $K_E$, a coupling loss between the optical fiber and the sheet-shaped light guide is $K_F$, a coupling loss between the optical fiber and the light receiver is $K_R$, and an internal loss of the optical fiber is $K_{FI}$, the following relationship is established:

$$PRmin_{dBm} < P(\text{Receiver\_min})_{dBm} \cdot K_E \cdot K_F \cdot K_R \cdot K_{FI} \qquad (29)$$

This expression (29) becomes the necessary condition for the communication system using the sheet-shaped light guide.

<BER (Bit-Error-Rate)>

The BER is an index indicating how much difference occurs between an original digital signal randomly generated and a received digital signal as a result of transmitting the original digital signal through a certain communication medium. When the number of transmitted bits is Bits and the number of bit errors is Biter, the BER is represented as follows:

$$BER = Biter/Bits \qquad (30)$$

Next, a mechanism of the bit error generation will be discussed. First, distortion of an analog waveform created when an analog signal is converted into a digital signal is listed as a first factor. Moreover, the bit error is increased when a signal level is lowered, and accordingly, it is necessary to consider also S/N as a factor. Even when the signal level is lowered owing to the distortion of the waveform, the bit error should not occur if the signal level stably exceeds a threshold value for distinguishing "0" and "1" signals. Accordingly, when noise comes flying from the outside or occurs in the inside of the system to give a level change to the distorted waveform, such a phenomenon is conceived to become a cause of the bit error (see FIG. 12).

The most significant factor of the waveform distortion in the communication system using the sheet-shaped light guide is conceived to be waveform distortion owing to distortion of a received signal itself in which an arbitrary incident segment is corresponding to an exit segment, and a phase shift of each signal component included in a mixing signal corresponding to each incident segment and an arbitrary exit segment. Moreover, the above-described waveform distortion results from an optical path difference of signal light. Elements causing the optical path difference in the communication system using the optical fibers and the sheet-shaped light guide are the sheet-shaped light guide itself and the optical fibers. Specifically, it is supposed that the bit error occurs because the signal level is made lower than a predetermined threshold value by the waveform distortion when an analog signal is converted into a digital signal. Furthermore, when it is assumed that the digital signal is accompanied with a reference signal (reference clock) when being transmitted, and that the reference signal is referred to also when the digital signal is read, it is conceived that the bit error occurs when the phase difference (jitter) between the reference signal and the digitized signal is increased. Moreover, an analog signal in the vicinity of the threshold value fluctuates with respect to the threshold value owing to fluctuations by the noise, and is converted into an erroneous digital signal. Specifically, it is supposed that the bit error occurs because the factors of the optical path difference and the noise are combined.

<Relationship between Optical Path Difference and Bit-Error-Rate (BER)>

Waveform distortion for the respective numbers of nodes, which are 4, 8 and 16, in the communication systems each using the sheet-shaped light guide, are shown in FIGS. 13A and 13B (4 nodes), FIGS. 14A and 14B (8 nodes), and FIGS. 15A and 15B (16 nodes). In these communication systems, an outer diameter of each optical fiber is 1 mm, and a length thereof is 1 m in which the optical path difference is ignorable. The optical fibers are provided in parallel while being closely adjacent to one another both on the light incident side and on the light exit side.

Moreover, numerical values of "In" and "Out" in each graph represent a light incident position and a light emission position by distances from a center position of the sheet-shaped light guide in the direction where the optical fibers are arrayed. The distances are represented by mm, and positions on a side where there are the optical fibers onto which the light is made incident are added with negative symbols (−), and positions on the other side are added with positive symbols (+). Specifically, FIG. 13A shows waveform distortion in the case where the light is made incident onto an optical fiber having a center at a position of −1.5 mm from the above-described center position, that is, the second optical fiber from the center position in the negative direction (optical fiber 21 in an example of FIG. 18 to be described later) and the light is emitted from an optical fiber having a center at the same position (optical fiber 31 in FIG. 18). FIG. 13B shows waveform distortion in the case where the light is made incident onto the optical fiber at the same position as described above (optical fiber 21 in FIG. 18) and the light is emitted from an optical fiber having a center at a position of +1.5 mm from the above-described center position, that is, a second optical fiber from the center position in the positive direction (optical fiber 34 in FIG. 18). Moreover, FIG. 14A shows waveform distortion in the case where the light is made incident onto an optical fiber having a center at a position of −3.5 mm from the above-described center position, that is, a fourth optical fiber from the center position in the negative direction and the light is emitted from an optical fiber having a center at the same position. FIG. 14B shows waveform distortion in the case where the light is made incident onto the optical fiber having the center at the same position as described above and the light is emitted from an optical fiber having a center at a position of +3.5 mm from the center position, that is, a fourth optical fiber from the center position in the positive direction. Furthermore, FIG. 15A shows waveform distortion in the case where the light is made incident onto an optical fiber having a center at a position of −7.5 mm from the above-described center position, that is, an eighth optical fiber from the center position in the negative direction and the light is emitted from an optical fiber having a center at the same position. FIG. 15B shows waveform distortion in the case where the light is made incident onto the optical fiber at the same position as described above and the light is emitted from an optical fiber having a center at a position of +7.5 mm from the above-described center position, that is, an eighth optical fiber from the center position in the positive direction.

From these graphs, it can be understood that the level change owing to the waveform distortion is ignorable in an input signal of 1 Gbps.

<Relationship Between S/N and BER>

It is conceived that an occurrence of erroneous reading (bit error) is also related to quality of the signal, that is, S/N. Specifically, even if main components of spectra of adjacent signals from which harmonic components are removed are separated, when the harmonic components (noise components) are large, signals cannot be distinguished as individual signals. When an extreme case is imagined, it is conceived that it is usually impossible to detect such a signal buried in the noise components unless the signal is particularly subjected to filtering processing.

As the noise component, there is external noise such as radiation noise and induction noise, in addition to noise occurring in the inside of the system, such as thermal noise (Johnson Noise), quantum noise (Shot Noise), 1/f noise characteristic of a semiconductor device for use in the light emitter and the light receiver. Here, for the purpose of evaluating performance of the system itself, the external noise is ignored, and only the noise occurring in the inside of the system is considered. Moreover, an influence of the 1/f noise is ignored.

Power(Noise(Total)) of the noise components is represented as:

$$\text{Noise(Total)} = \text{Noise(thermal)} + \text{Noise(quantum)} \quad (31)$$

Each component represented by the power for a light receiving element is as follows:

$$\text{Noise(thermal)} = (4\,kT/R)\cdot\Delta v \quad (31a)$$

k: Planck constant
T: equivalent temperature (determined by noise factor)
R: load resistance of light receiver
Δv: band of light receiver $$\text{Noise(quantum)} = 3e^2\cdot(P+P_B)\cdot\eta\cdot\Delta v/(hv) + 2ei_d\Delta v \quad (31b)$$

e: electron charge
P: signal light power
$P_B$: background light power
η: quantum efficiency
h: Planck constant
v: frequency of signal light
$i_d$: dark current
Δv: band of light receiver Here, it is considered to rectify a signal of the 0.25 GHz band, output of which is not lowered, when a signal of 0.5 Gbps is generated. Specifically, the band of the photodiode is 0.25 GHz. In this case, as an example, for a Si-photodiode: S5973 made by Hamamatsu Photonics K.K., the noise components are calculated where P=8.9×10$^{-6}$W (20.5 dBm), η=0.4, R=50 Ω, and T=300K. The calculated values converted into current values become as follows:

$$\text{Noise(thermal}_{rms}) = 2.88 \times 10^{-7}(A)$$

$$\text{Noise(quantum}_{rms}) = 8.19 \times 10^{-8}(A)$$

The total noise component becomes as follows:

$$\text{Noise(total}_{rms}) = 3.70 \times 10^{-7}(A) \quad (32)$$

Meanwhile, a signal current Sc in the minimum received optical power is given by:

$$Sc = P\cdot e\cdot\eta/(h\cdot v) \quad (33)$$

Accordingly, a signal current S (min) cat the minimum received optical power becomes as follows:

$$S(\min)c = 2.46 \times 10^{-6}(A)$$

Therefore, a signal-to-noise ratio (S/N) in this case becomes S/N(Pmin)=6.65.

Incidentally, when the noise is approximated by Gaussian because the thermal noise is dominant over the distribution of the noise, a probability of occurrence of noise Pr(S/N=1) in the case where the system noise at certain timing becomes 6.65 times the rms noise, that is, in the case where a signal current level becomes equal to a noise current level (S/N=1), becomes as follows:

$$Pr(S/N=1) \approx 3.47 \times 10^{-11}$$

The probability thus becomes a value approximate to BER≈1×10$^{-11}$, and becomes a value approximate to a probability of occurrence of the BER in the above-described "High-Uniformity Star Coupler Using Diffused Light Transmission" IEICE TRANS. ELECTRON, Vol. E84C, No. 3 MARCH 2001 p. 339. Furthermore, in the case of using a high-pass filter of approximately 20 MHz, which causes no trouble in transmission of the digital signal, the following are obtained:

$$S/N(Pmin)=6.81$$

$$Pr(S/N=1) \approx 1.31 \times 10^{-11}$$

These substantially agree with those described in "High-Uniformity Star Coupler Using Diffused Light Transmission" IEICE TRANS. ELECTRON, Vol. E84C, No. 3 MARCH 2001 p. 339. Specifically, the above-described results constitute grounds for conceiving that the conventional supposition regarding the BER is correct. Note that, in FIG. 16, the relationship between levels of the root mean square (rms) noise and probabilities of occurrence thereof is shown.

Furthermore, the supposition regarding the BER is further advanced, and a more practical technique will be discussed. First, typical rms noise (voltage value) in the communication system using the sheet-shaped light guide is measured, and defined as Noise(System_rms). Additionally, when the BER acceptable in the system is defined as BER(accept) and the relevant received signal power is defined as PRmin, a signal voltage S(PRmin)v is represented as follows:

$$S(PRmin)v=PRmin \cdot e \cdot \eta/(h \cdot v) \times R \quad (34)$$

where R is a load resistance. Moreover, a level of the threshold value of the (0, 1) signal is defined as V(Thresh), and S/N(Thresh) in which the level of the threshold value is considered is defined as follows:

$$S/N(\text{Thresh})=\{S(PRmin)v-V(\text{Thresh})\}/\text{Noise(System\_rms)} \quad (35)$$

When the value given by this equation (35) reaches a certain value, the BE occurs at a certain probability, which is defined as S/N accept. Then, from the above-described discussion, it is conceived that the probability of occurrence of the Noise(System_rms) in this case is equal to the BER. FIG. 17 shows the relationship between the received optical power and the BER calculated on the basis of the above-described discussion. This relationship closely approximates to the result of the actual measurement in "High-Uniformity Star Coupler Using Diffused Light Transmission" IEICE TRANS. ELECTRON, Vol. E84C, No. 3 MARCH 2001 p. 339, and a shape thereof is also very similar to that thereof.

Considering the V (Thresh), the BE occurs when a value obtained by subtracting the noise component from the signal component is lower than the V(Thresh) and when a value obtained by adding the noise component to the "0" level exceeds the V(Thresh). Therefore, it is conceived desirable that the V(Thresh) be set at a half value of an average signal voltage.

From the above discussion, in the communication system using the sheet-shaped light guide, a communication system configured in the following manner can be defined. When the acceptable BER, that is, BER(accept) is given, and the rms noise of the system is defined as the Noise(System_rms), the probability Pr(Noise(System_rms)) of occurrence of the Noise(System_rms) is the Noise(System_rms) of a level which satisfies the following in a band where it is not necessary to consider the distortion of the signal waveform:

$$Pr(\text{Noise(System\_rms)} \cdot Q) \leq BER(\text{accept}) \quad (36)$$

where Q is a proportionality constant. At the same time, when an arbitrary threshold value V(Thresh) in binarization is given, the signal level is of the input signal PRmin which satisfies the following expression:

$$\{S(PRmin)v-V(\text{Thresh})\} > \text{Noise(System\_rms)} \cdot Q \quad (37)$$

Moreover, the signal level is of the signal voltage S(PRmin)v outputted through a load resistor from a light receiver which satisfies the expression (37).

Alternatively, for the above-described reason, the above-described expression (37) can also be defined as follows:

$$S(PRmin)v/2 > \text{Noise(System\_rms)} \cdot Q \quad (38)$$

Furthermore, such a circuit configuration as capable of measuring the BER in the inside of the system may be provided to adjust the output power PRmin of the light source so as to satisfy the BER(accept) condition, so that the expression (37) and the expression (38) is satisfied. In this case, it is made possible to cope with the external noise other than the Noise(System_rms) generated by the system itself, by providing a digital circuit which makes feedback from the BER measurement circuit to the light source side, and by configuring this digital circuit to control the optical power of the light source in accordance with a table determined on the basis of the BER(accept).

BRIEF DESCRIPTION OF THE DRAWINGS

FIG. 8C is a graph showing the relationship between particle diameter and light emission efficiency in a sheet-shaped light guide while comparing a result obtained by calculation and a result by simulation (average light emission efficiency: 60%).

FIG. 12 is an explanatory diagram for explaining an occurrence cause of a bit error.

FIG. 17 is a graph showing the relationship between Bit-Error-Rate (BER) and received optical power.

DESCRIPTION OF THE PREFERRED EMBODIMENT

Hereinafter, a description will be given of embodiments of the present invention with reference to the drawings.

Figure 1:
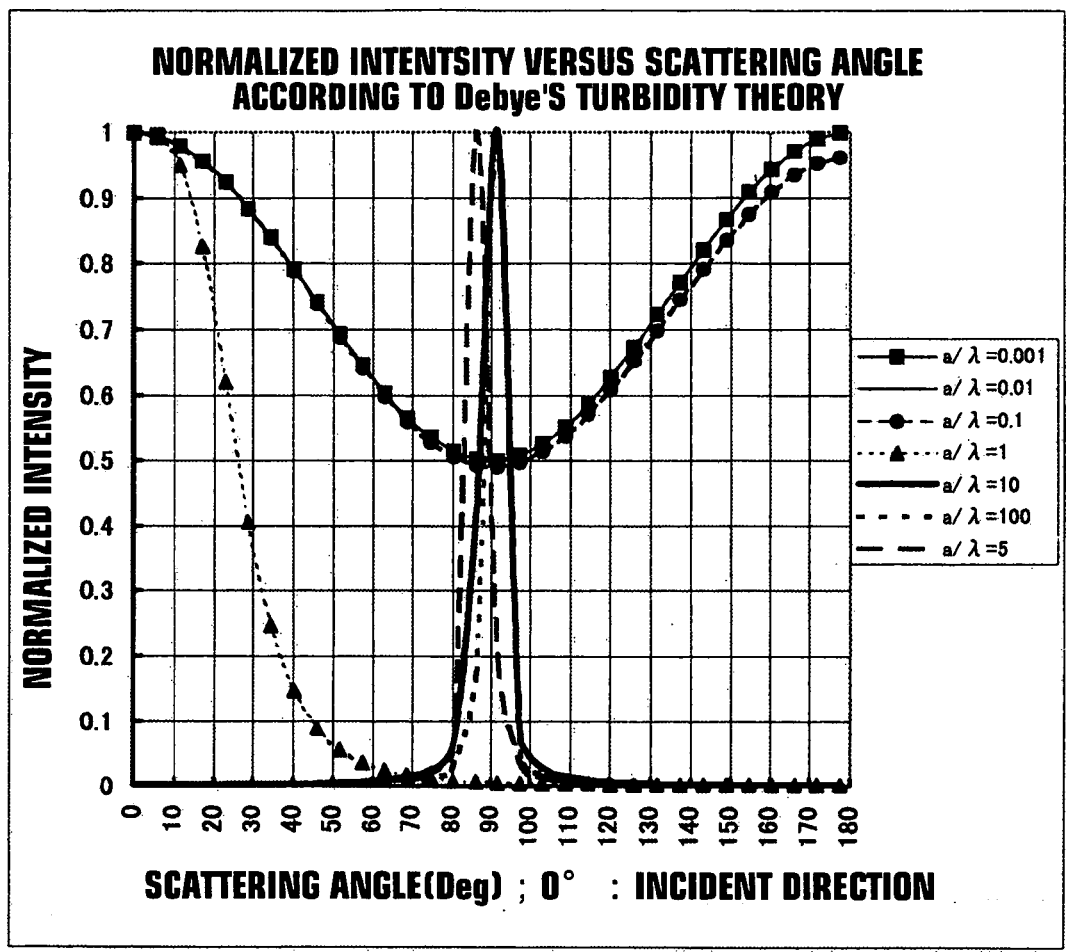
FIG. 1 is a graph of normalized intensity versus scattering angle according to Debye's turbidity theory.
Figure 2:
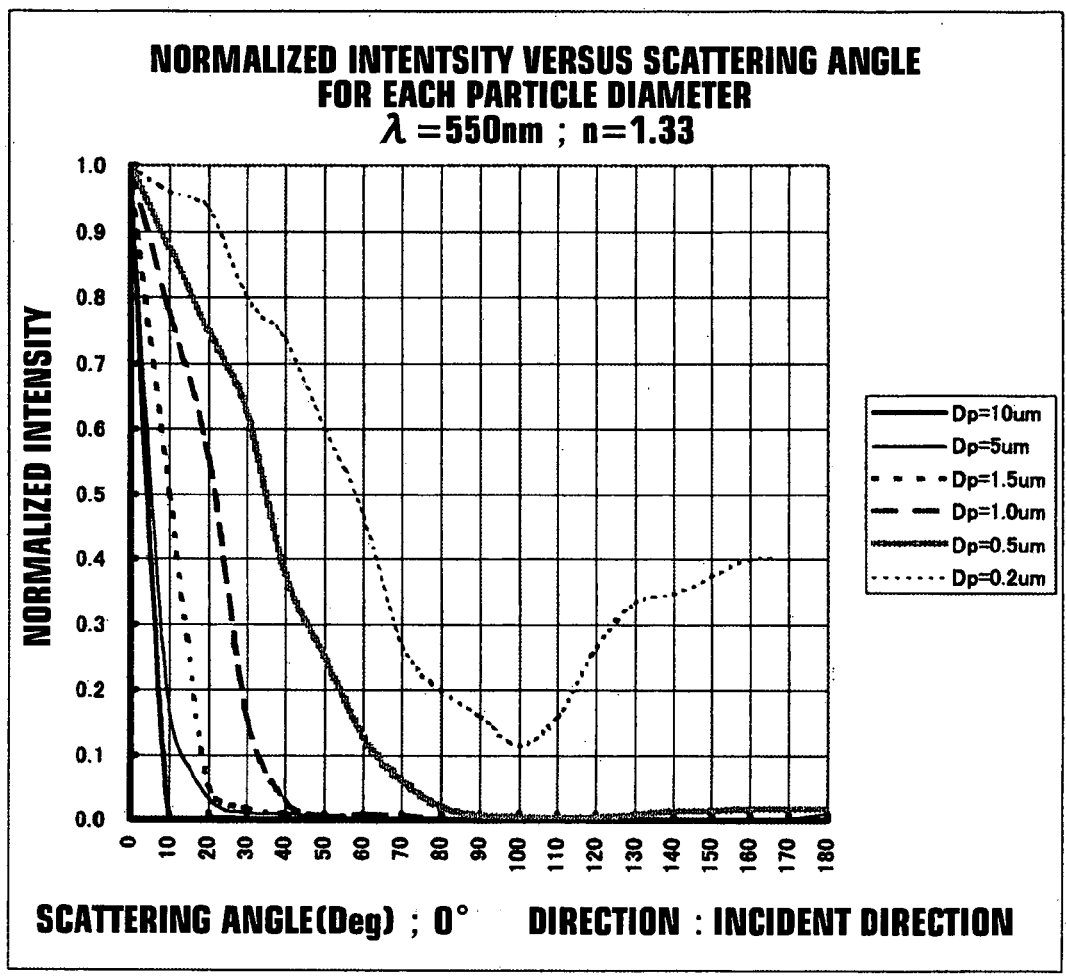
FIG. 2 is a graph of normalized intensity versus scattering angle according to Mie scattering theory.
Figure 3A:
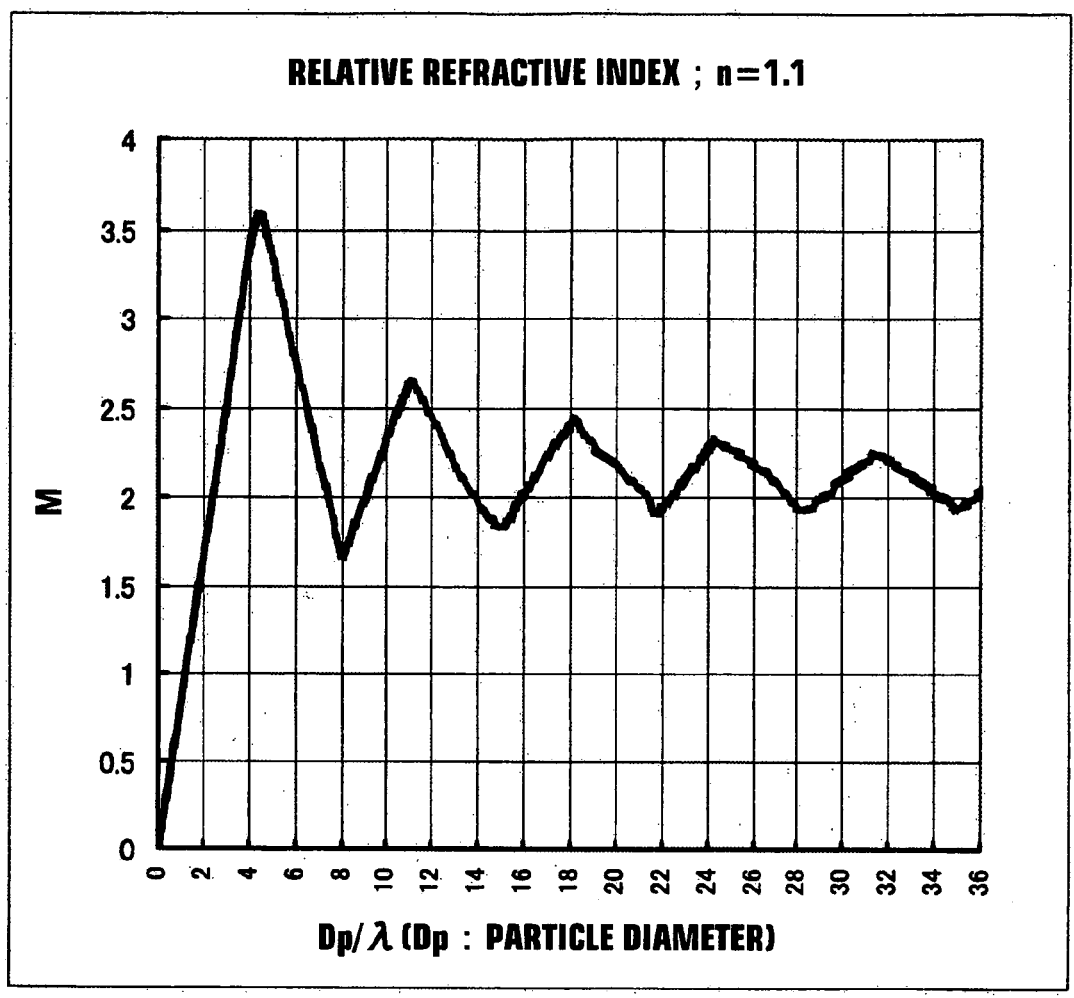
FIG. 3A is a graph showing a manner in which the scattering cross section oscillates in Mie scattering theory when a relative refractive index is 1.1.
Figure 3B:
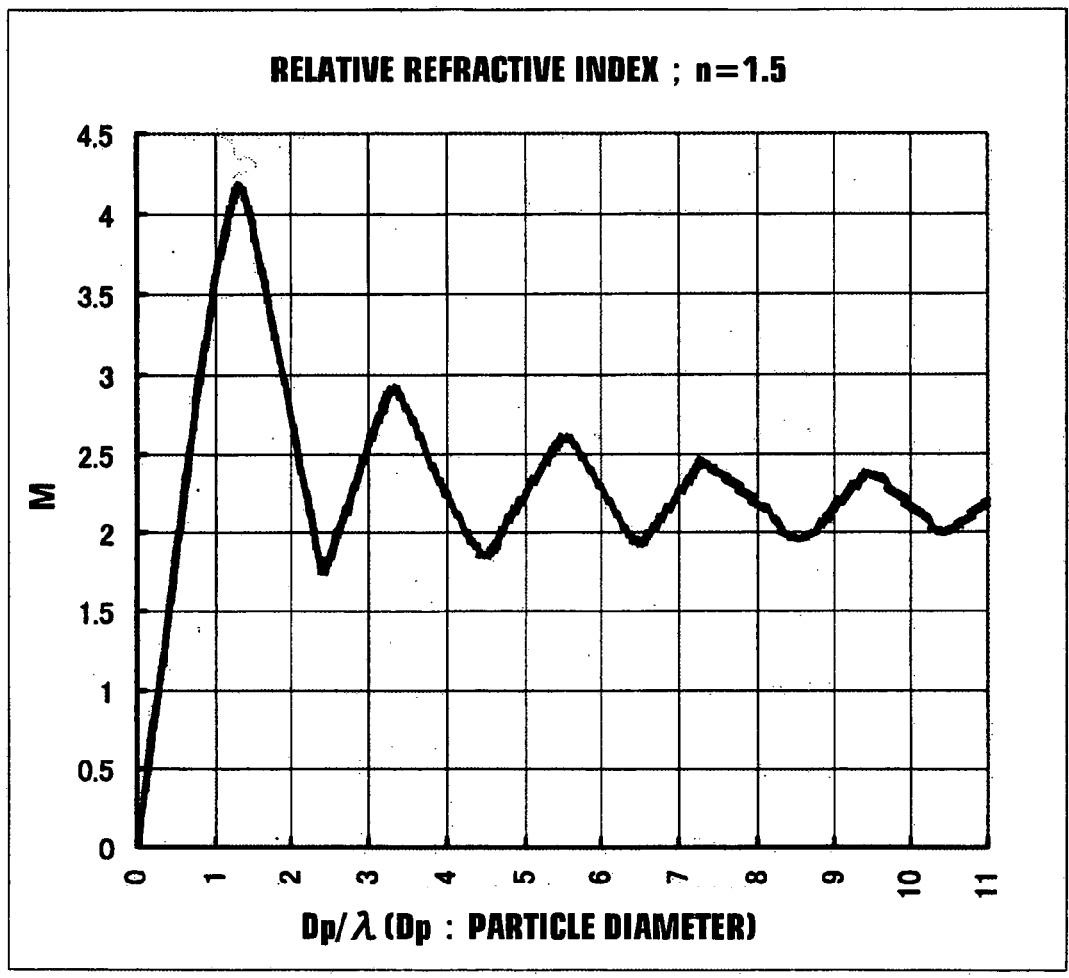
FIG. 3B is a graph showing a manner in which the scattering cross section oscillates in Mie scattering theory when a relative refractive index is 1.5.
Figure 3C:
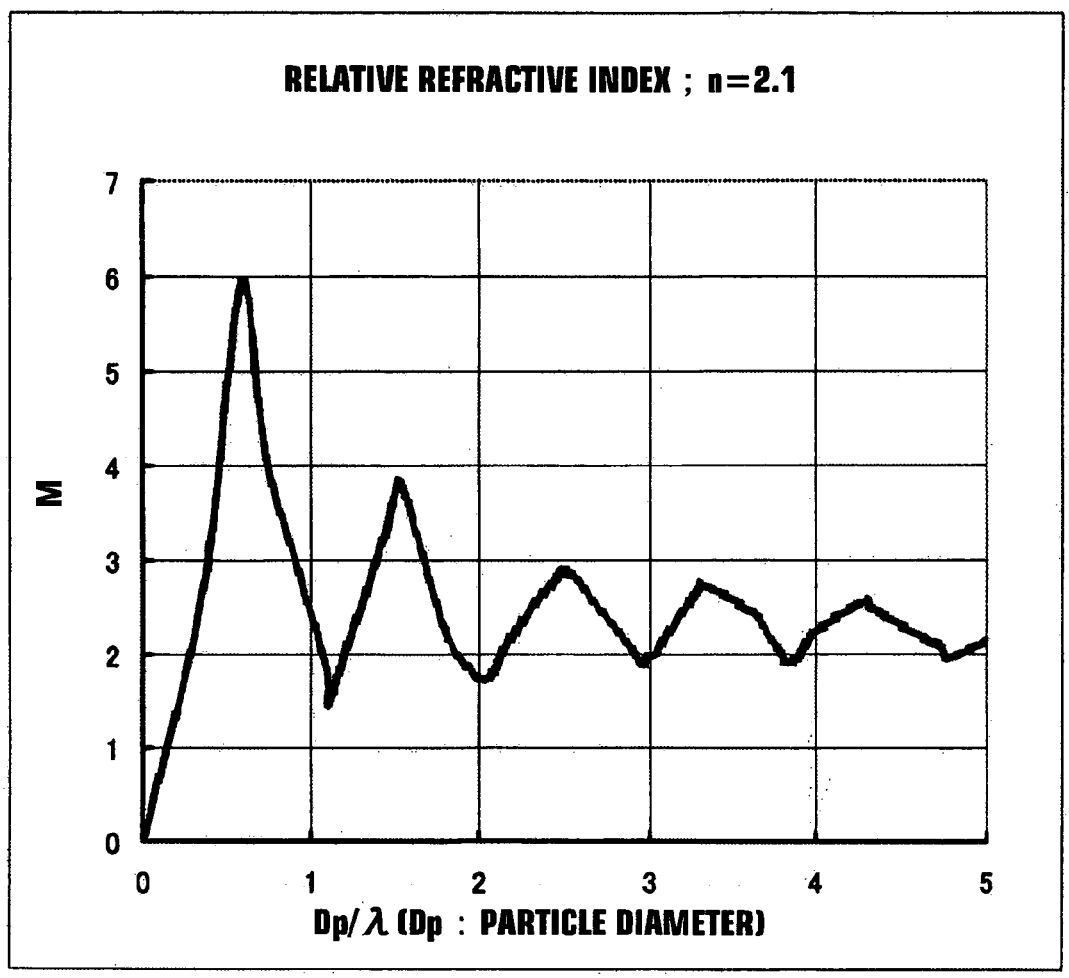
FIG. 3C is a graph showing a manner in which the scattering cross section oscillates in Mie scattering theory when a relative refractive index is 2.1.
Figure 4:
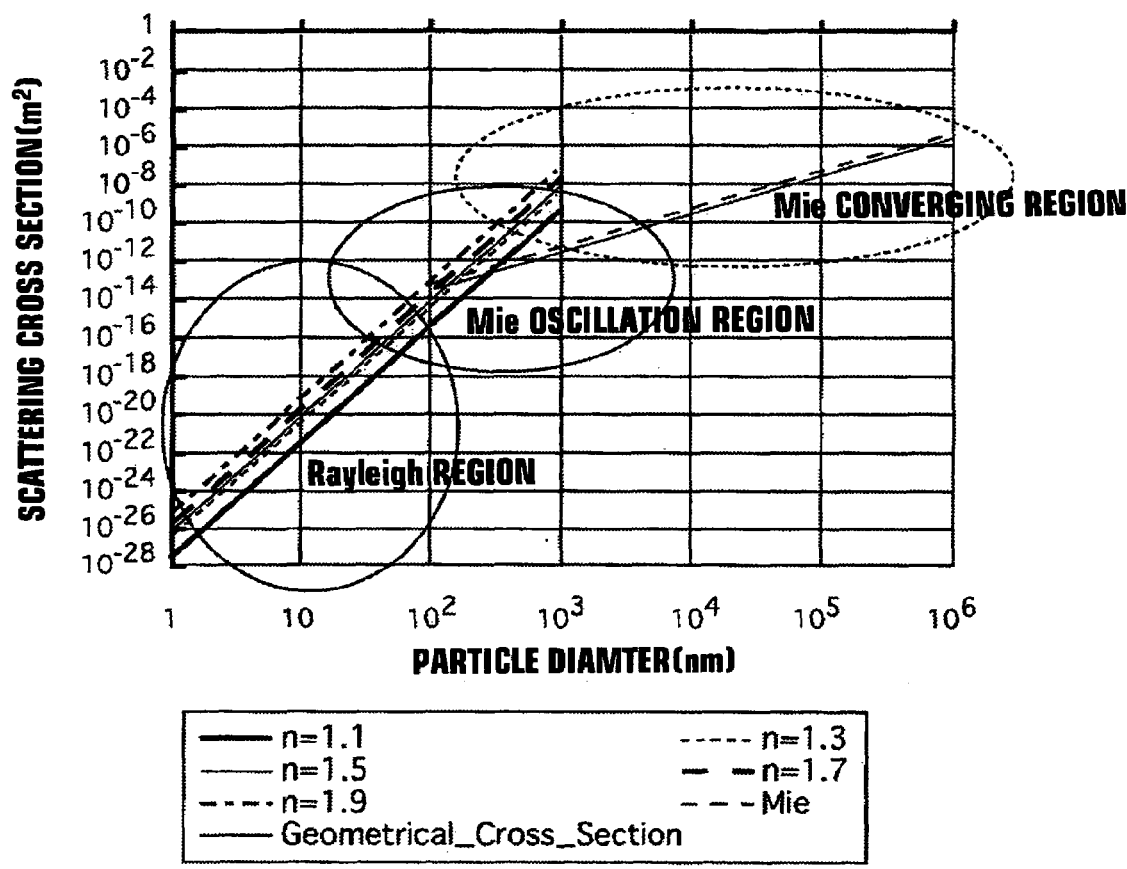
FIG. 4 is a graph showing results of the relationship between particle diameter and scattering cross section, which are obtained by means of computer simulation with respect to each of some relative refraction indexes.
Figure 5:
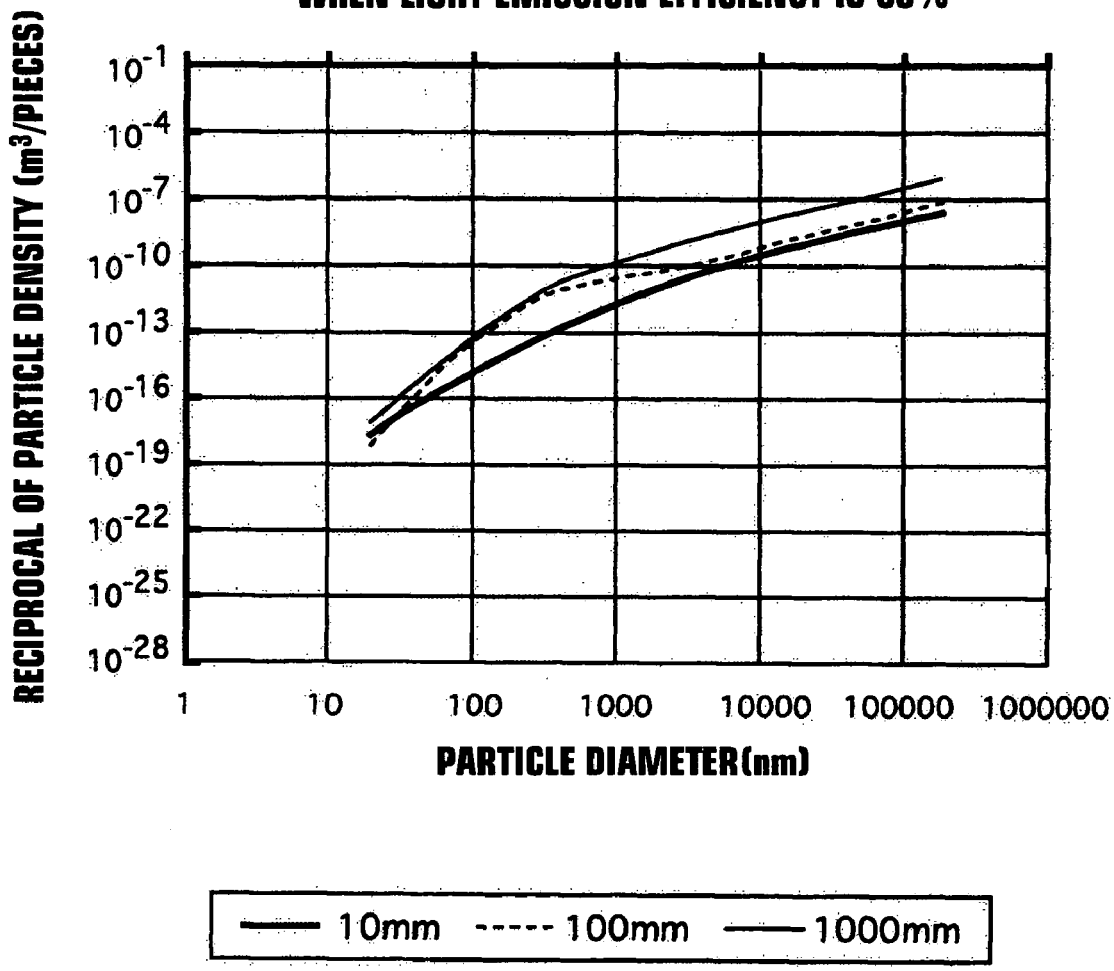
FIG. 5 is a graph showing results of the relationship between particle diameter and reciprocal of the particle density in a multi-particle system, which are obtained by means of the computer simulation.
Figure 6:
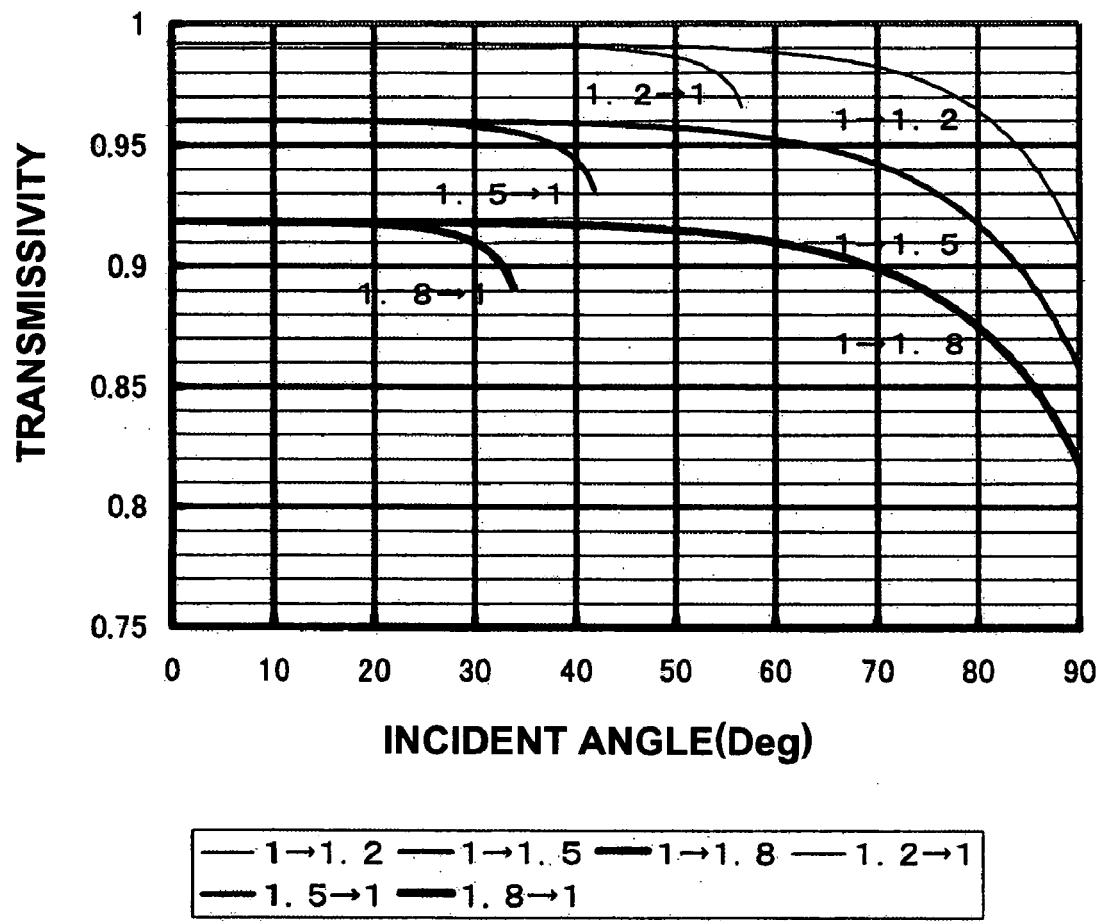
FIG. 6 is a graph showing Fresnel losses for various refractive indexes of an optical medium.
Figure 7A:
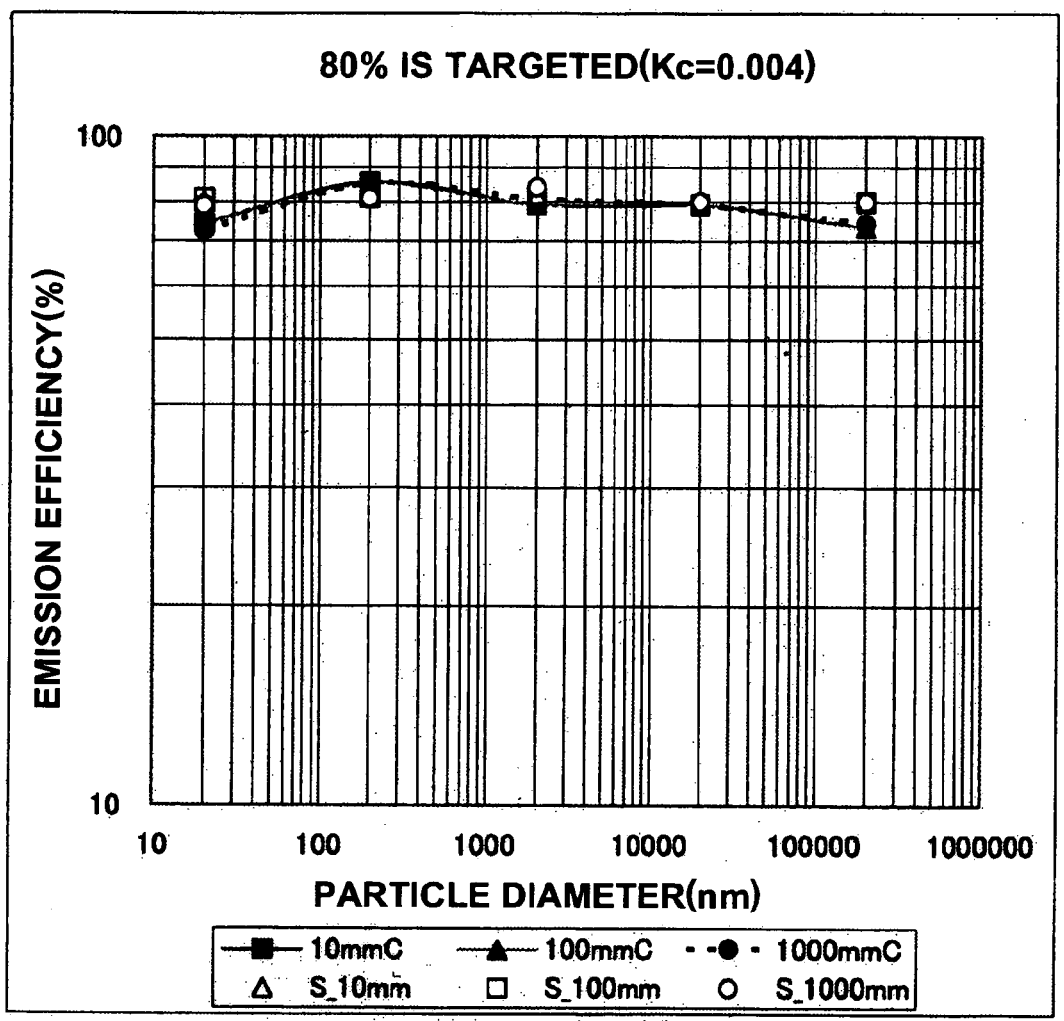
FIG. 7A is a graph showing the relationship between particle diameter and light emission efficiency while comparing a result obtained by the use of a method of the present invention and a result by means of a computer simulation (light emission efficiency of 80% is targeted).
Figure 7B:
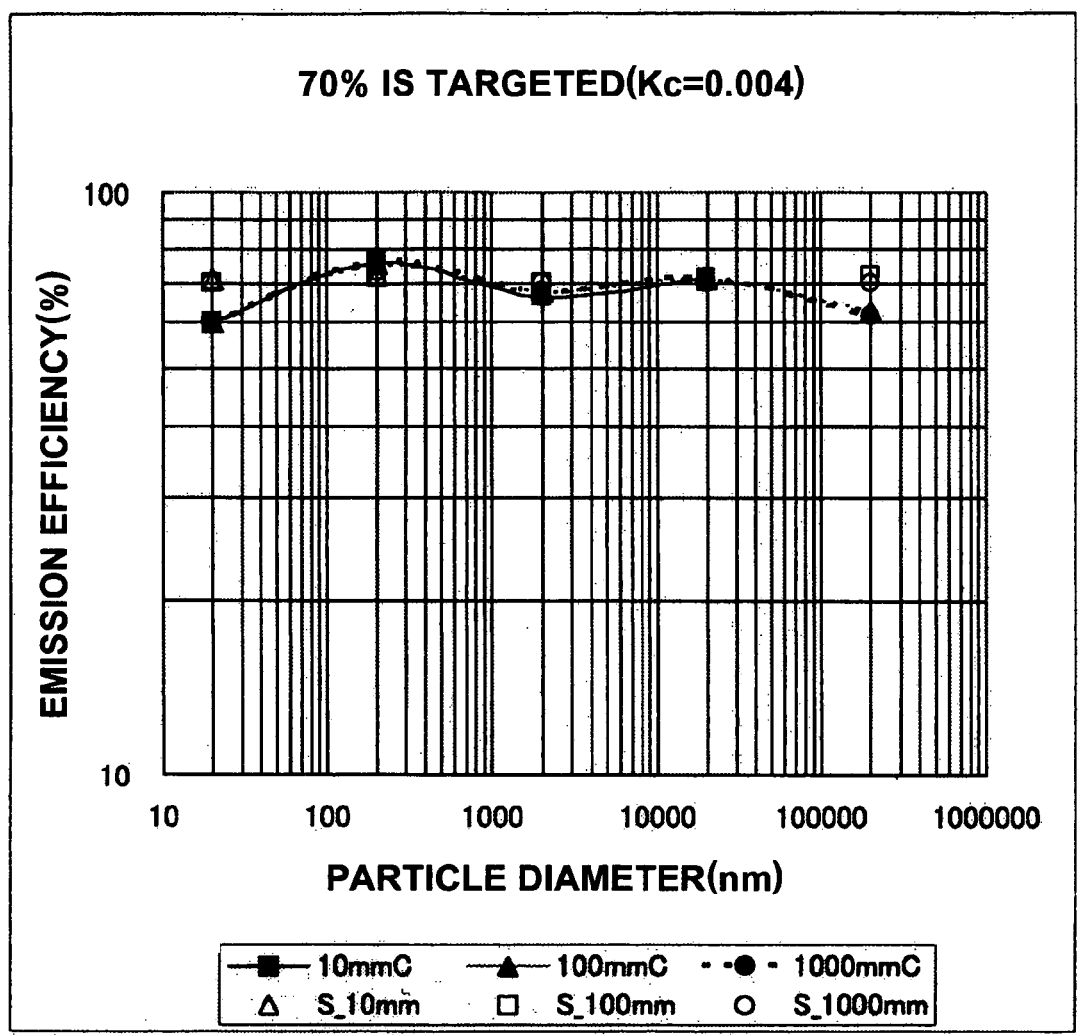
FIG. 7B is a graph showing the relationship between particle diameter and light emission efficiency while comparing a result obtained by the use of a method of the present invention and a result by means of a computer simulation (light emission efficiency of 70% is targeted).
Figure 7C:
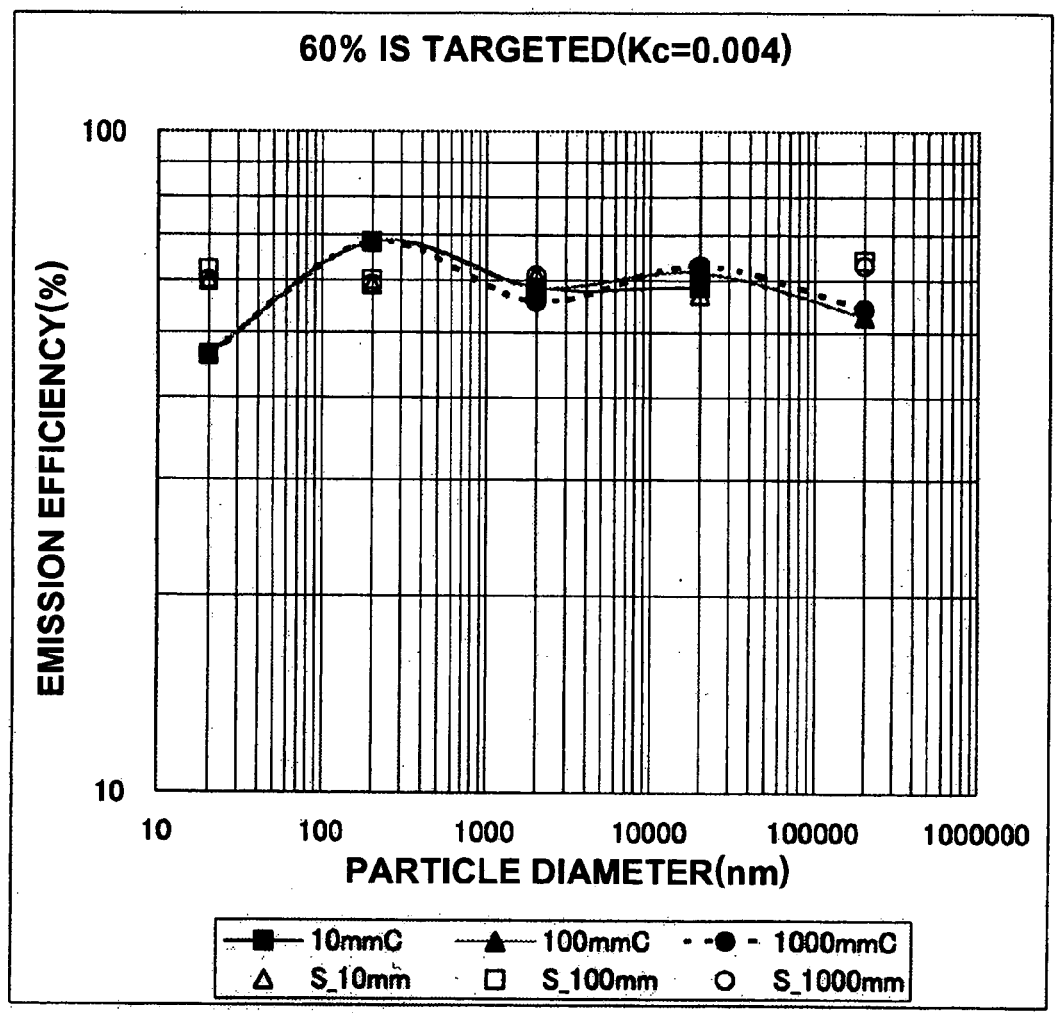
FIG. 7C is a graph showing the relationship between particle diameter and light emission efficiency while comparing a result obtained by the use of a method of the present invention and a result by means of a computer simulation (light emission efficiency of 60% is targeted).
Figure 7D:
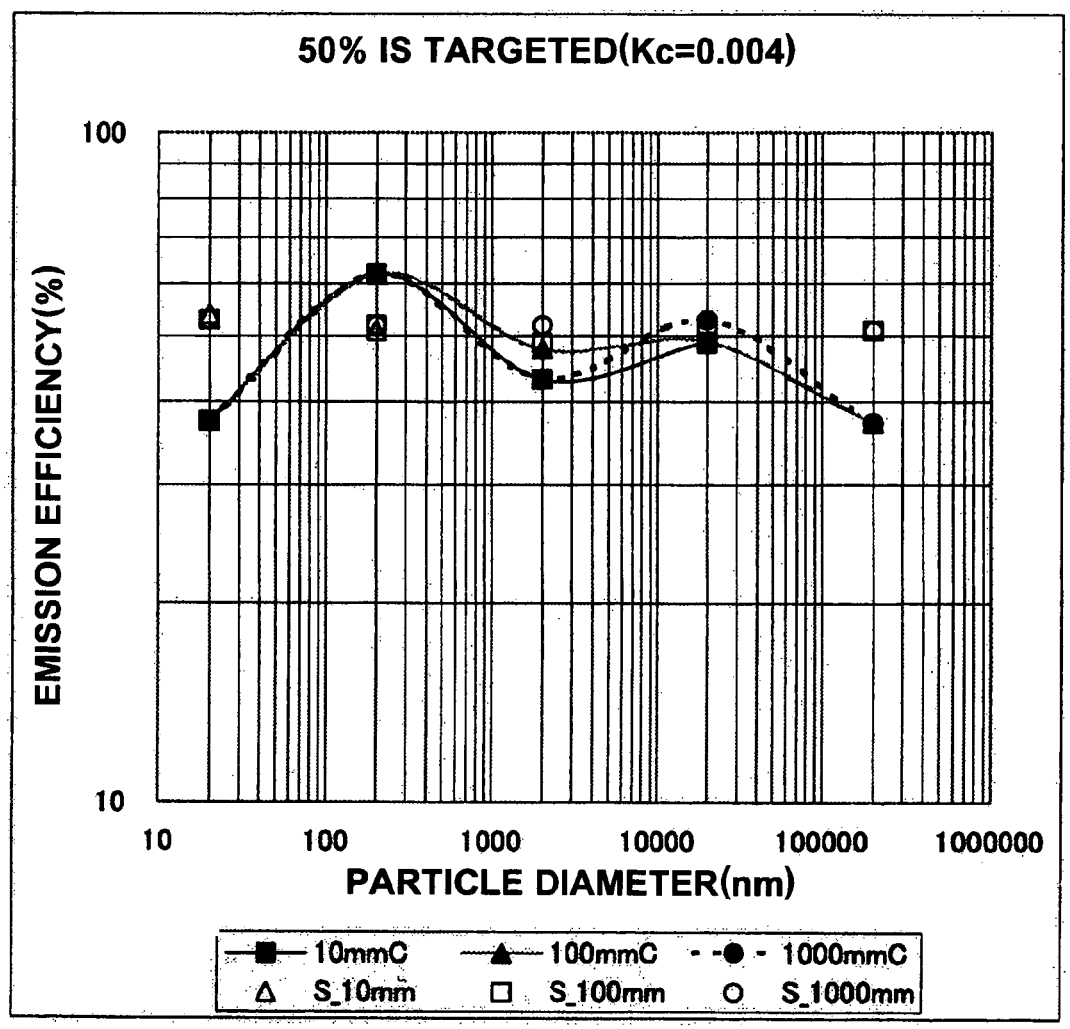
FIG. 7D is a graph showing the relationship between particle diameter and light emission efficiency while comparing a result obtained by the use of a method of the present invention and a result by means of a computer simulation (light emission efficiency of 50% is targeted).
Figure 7E:
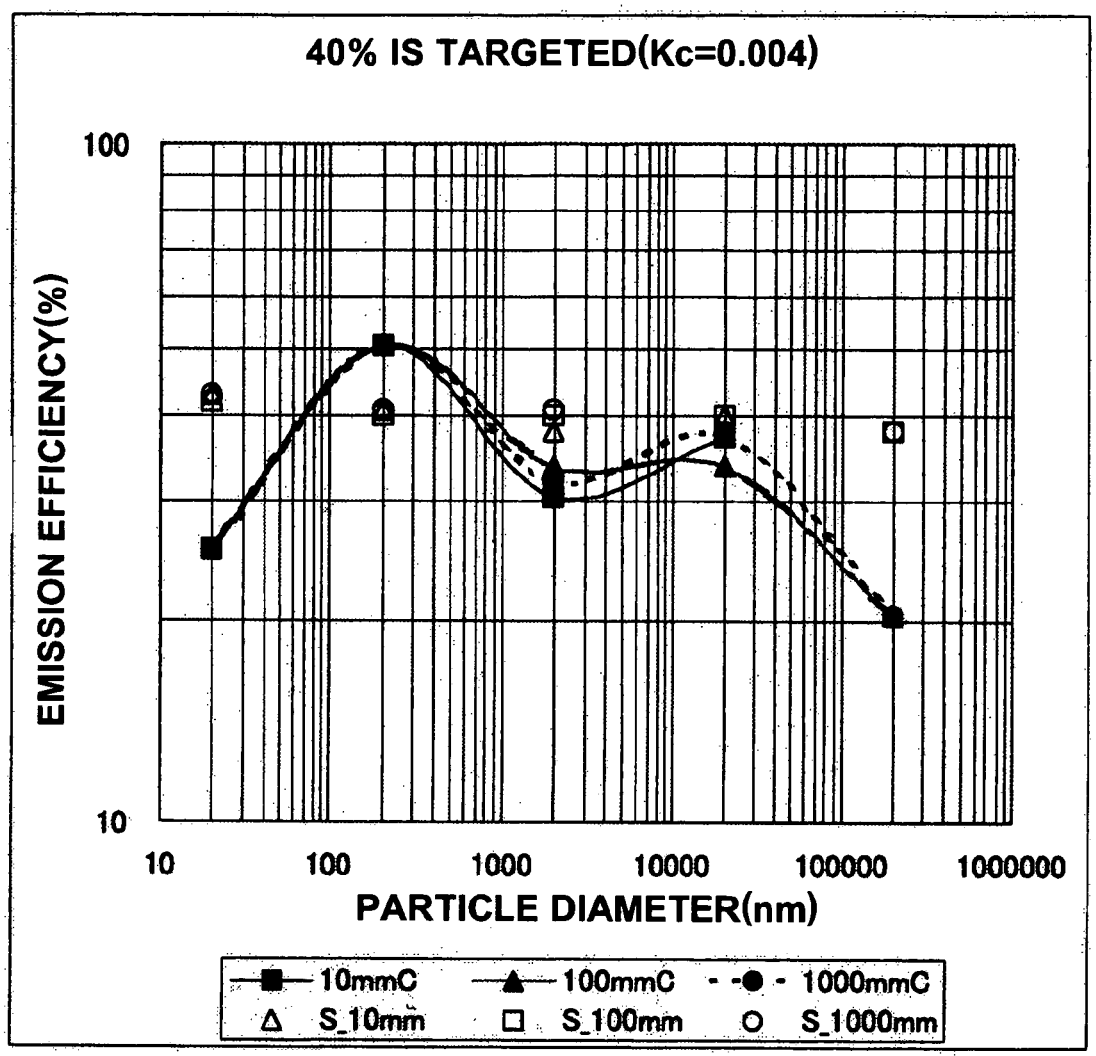
FIG. 7E is a graph showing the relationship between particle diameter and light emission efficiency while comparing a result obtained by the use of a method of the present invention and a result by means of a computer simulation (light emission efficiency of 40% is targeted).
Figure 8A:
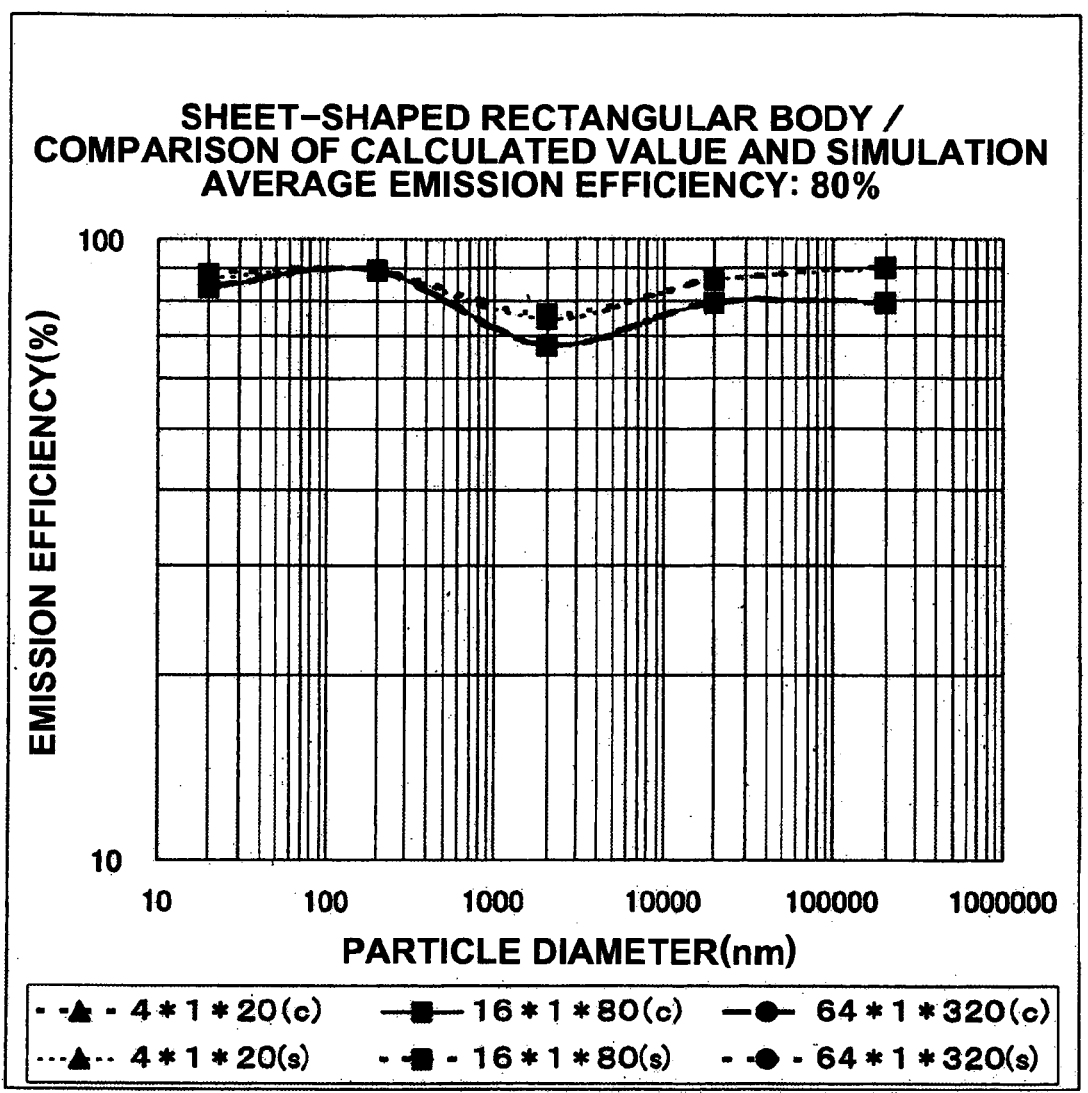
FIG. 8A is a graph showing the relationship between particle diameter and light emission efficiency in a sheet-shaped light guide while comparing a result obtained by calculation and a result by simulation (average light emission efficiency: 80%).
Figure 8B:
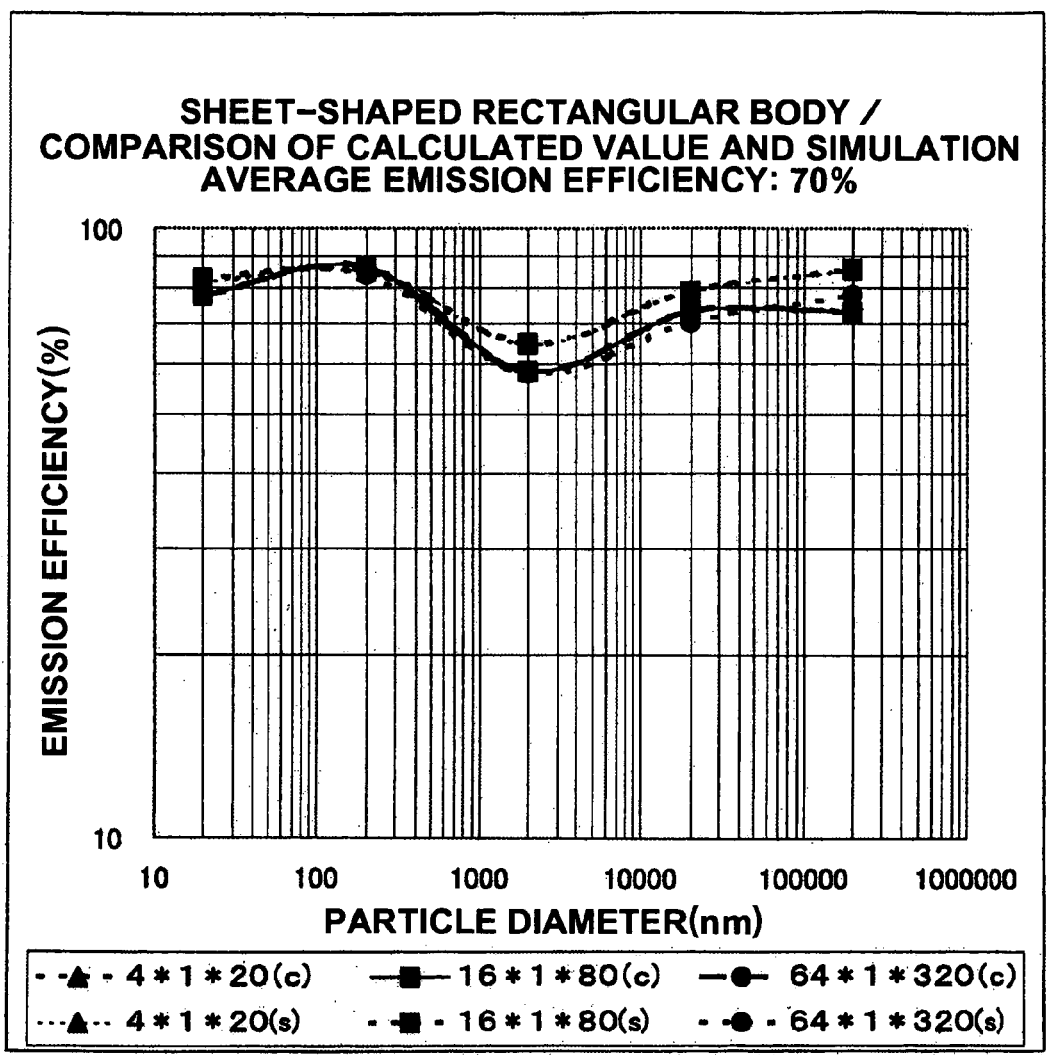
FIG. 8B is a graph showing the relationship between particle diameter and light emission efficiency in a sheet-shaped light guide while comparing a result obtained by calculation and a result by simulation (average light emission efficiency: 70%).
Figure 9A:
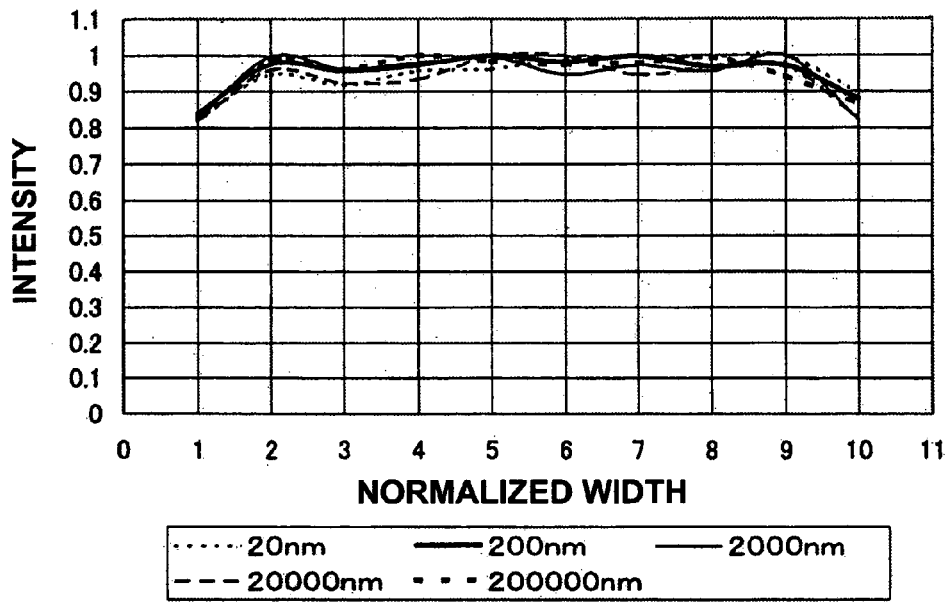
FIG. 9A is a graph showing distribution characteristics of emitted light intensity in a sheet-shaped light guide when the sheet size is small.
Figure 9B:
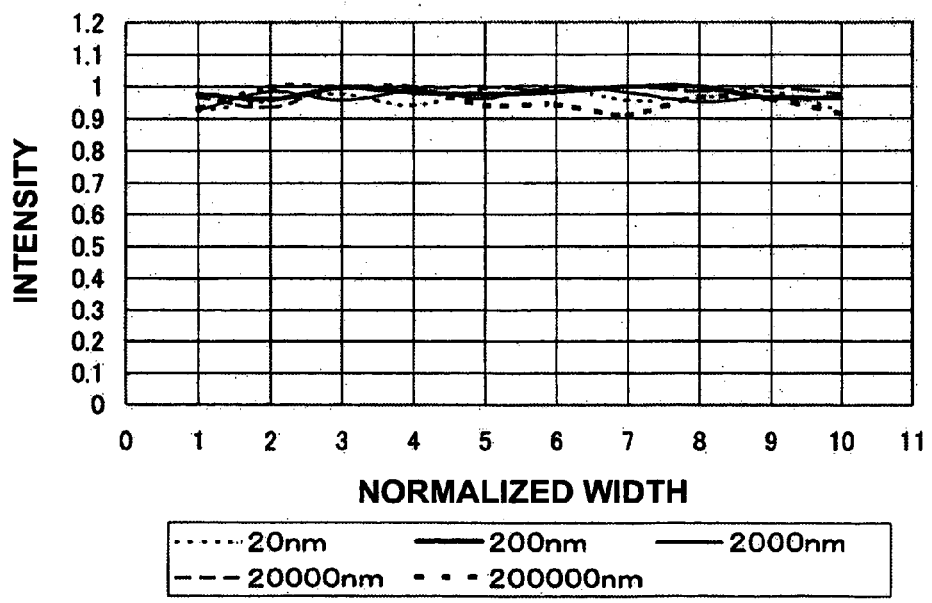
FIG. 9B is a graph showing distribution characteristics of emitted light intensity in a sheet-shaped light guide when the sheet size is medium.
Figure 9C:
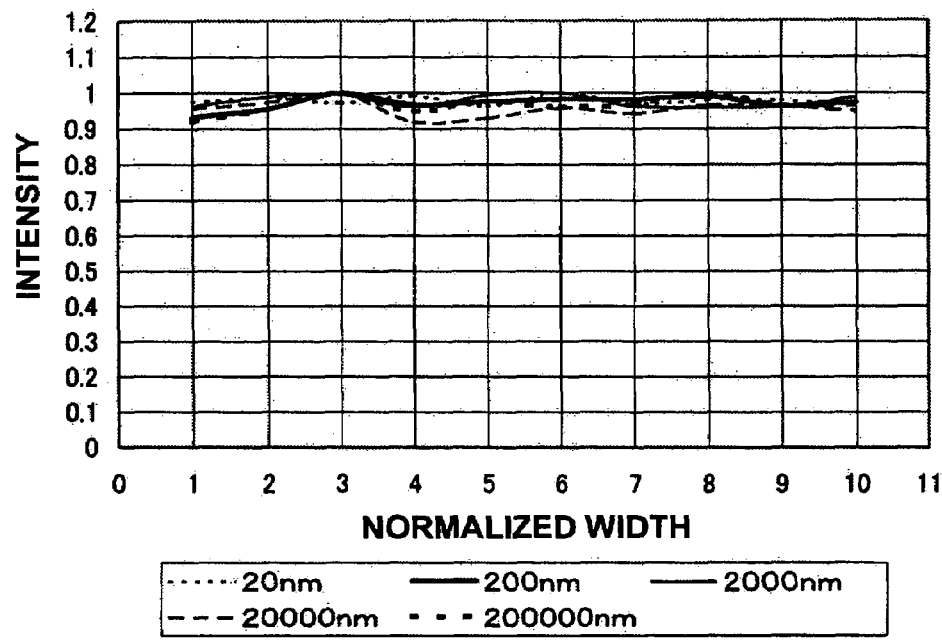
FIG. 9C is a graph showing distribution characteristics of emitted light intensity in a sheet-shaped light guide when the sheet size is large.
Figure 10:
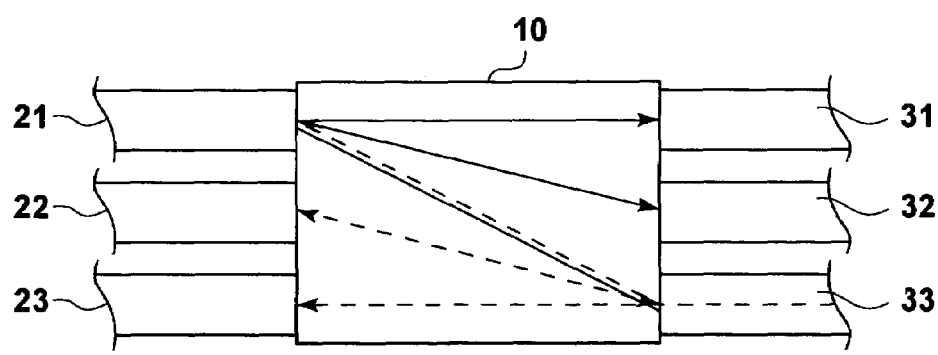
FIG. 10 is a plan view showing a schematic shape of a sheet-shaped light guide.
Figure 11:
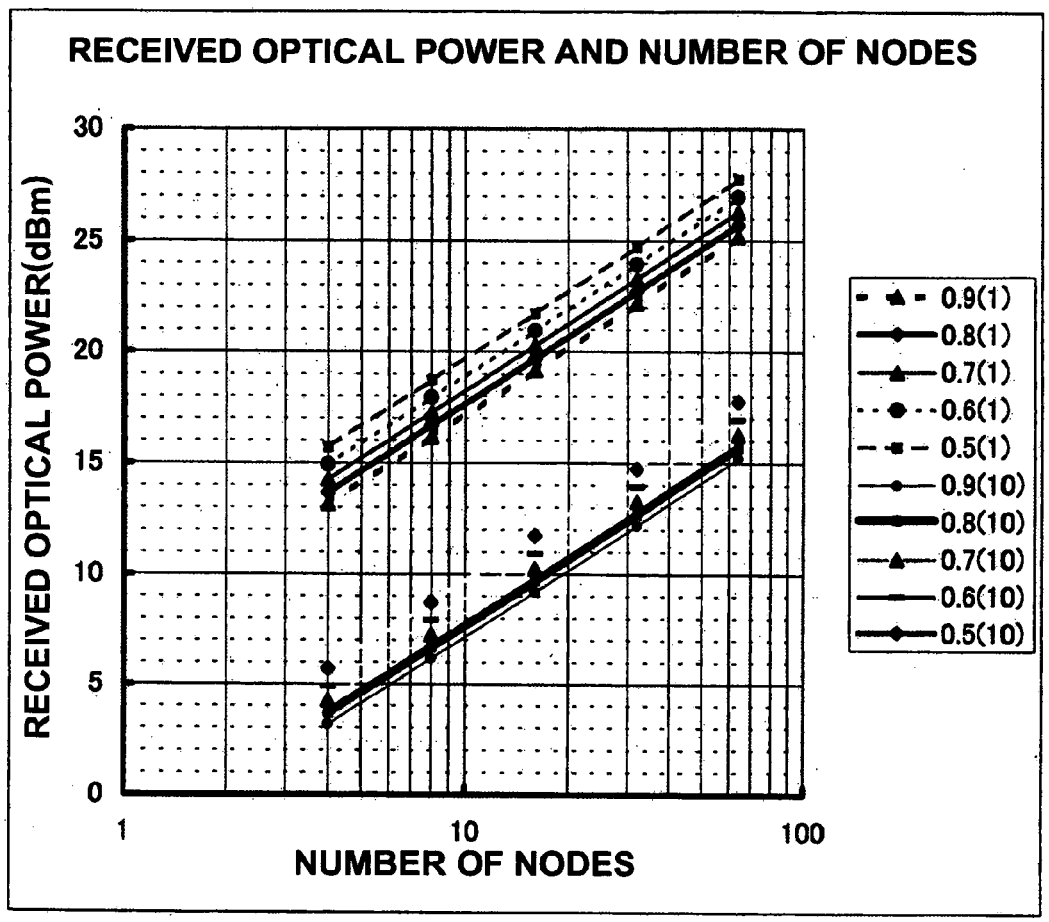
FIG. 11 is a graph showing the relationship between received optical power and number of nodes in a communication system using the sheet-shaped light guide.
Figure 13A:
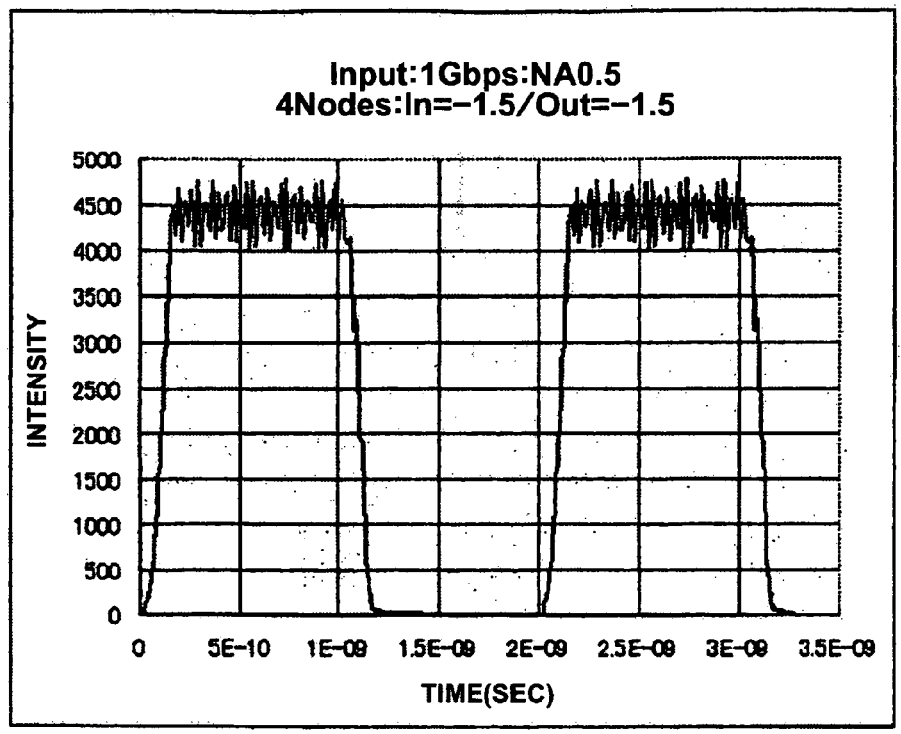
FIG. 13A is a graph showing an example of waveform distortion of signal light in a communication system using the sheet-shaped light guide, the number of nodes of which is four.
Figure 13B:
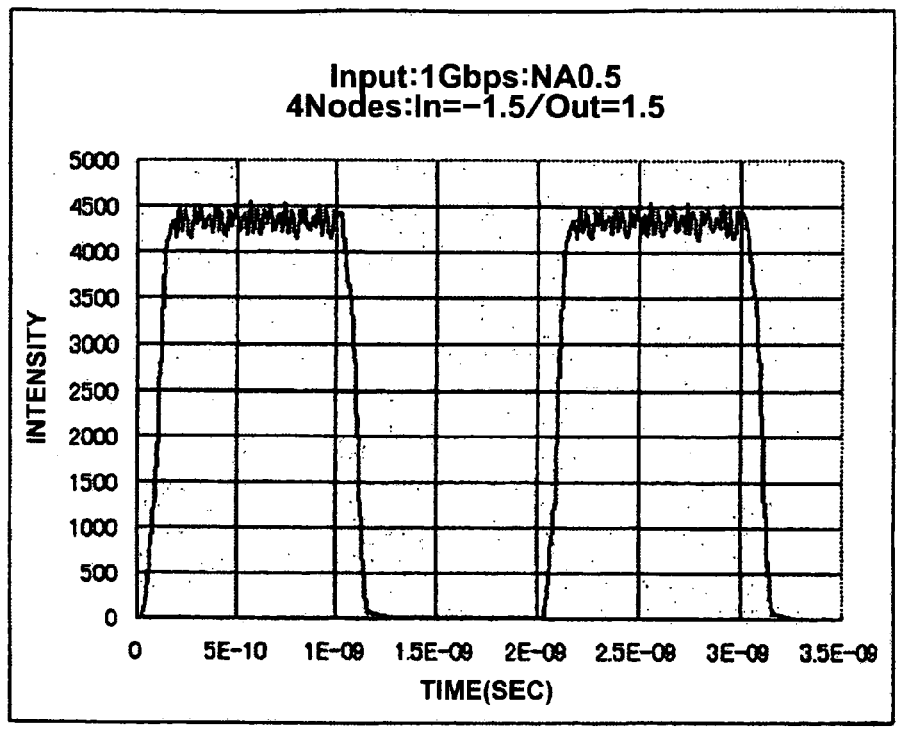
FIG. 13B is a graph showing another example of waveform distortion of signal light in the communication system using the sheet-shaped light guide, the number of nodes of which is four.
Figure 14A:
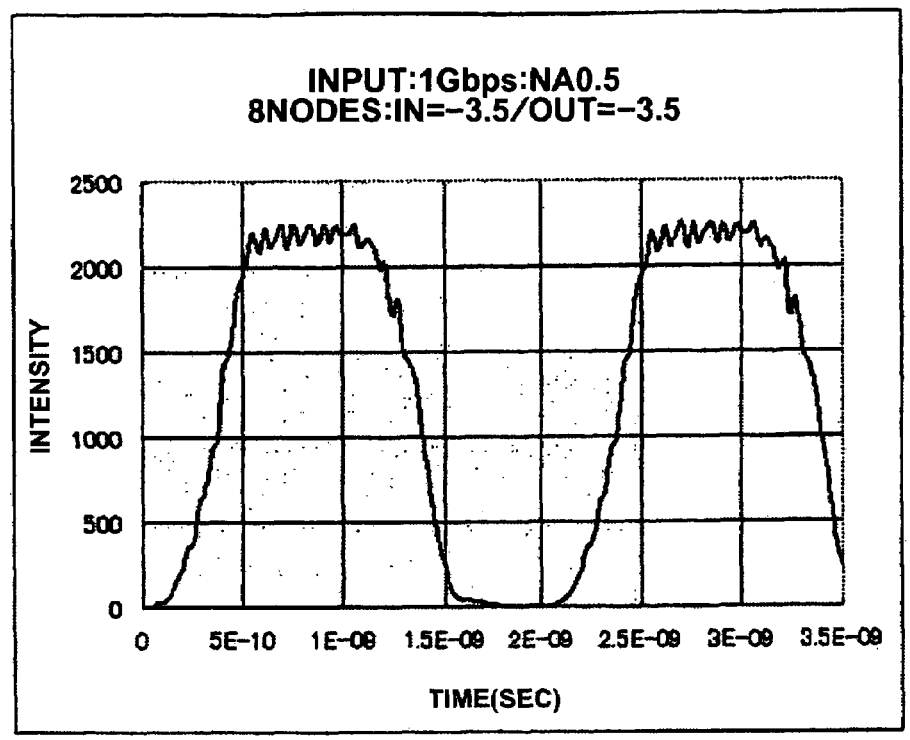
FIG. 14A is a graph showing an example of waveform distortion of signal light in a communication system using the sheet-shaped light guide, the number of nodes of which is eight.
Figure 14B:
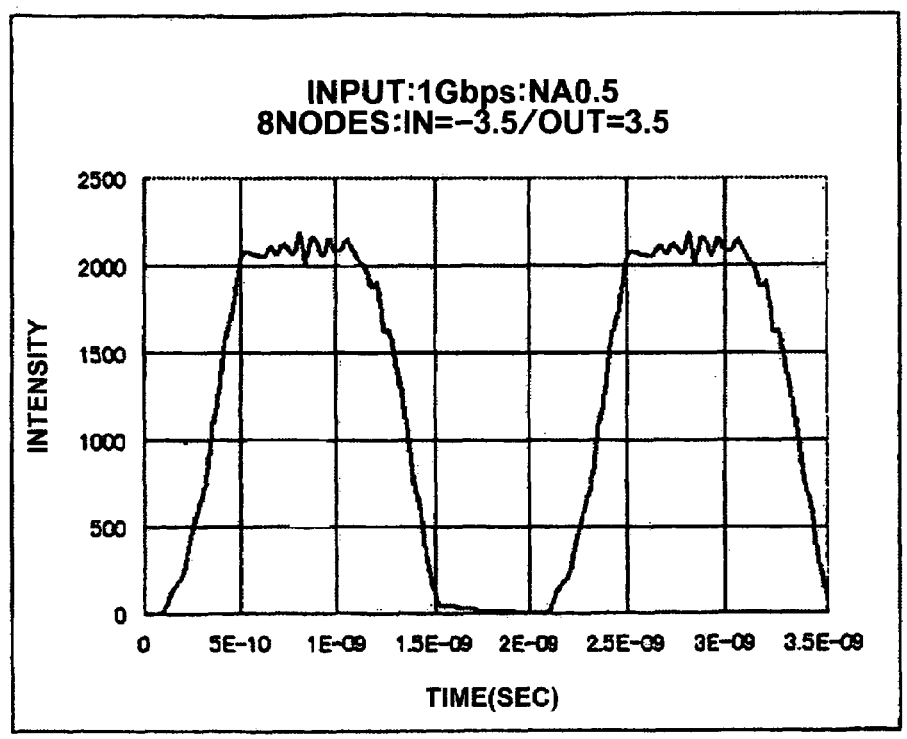
FIG. 14B is a graph showing another example of waveform distortion of signal light in the communication system using the sheet-shaped light guide, the number of nodes of which is eight.
Figure 15A:
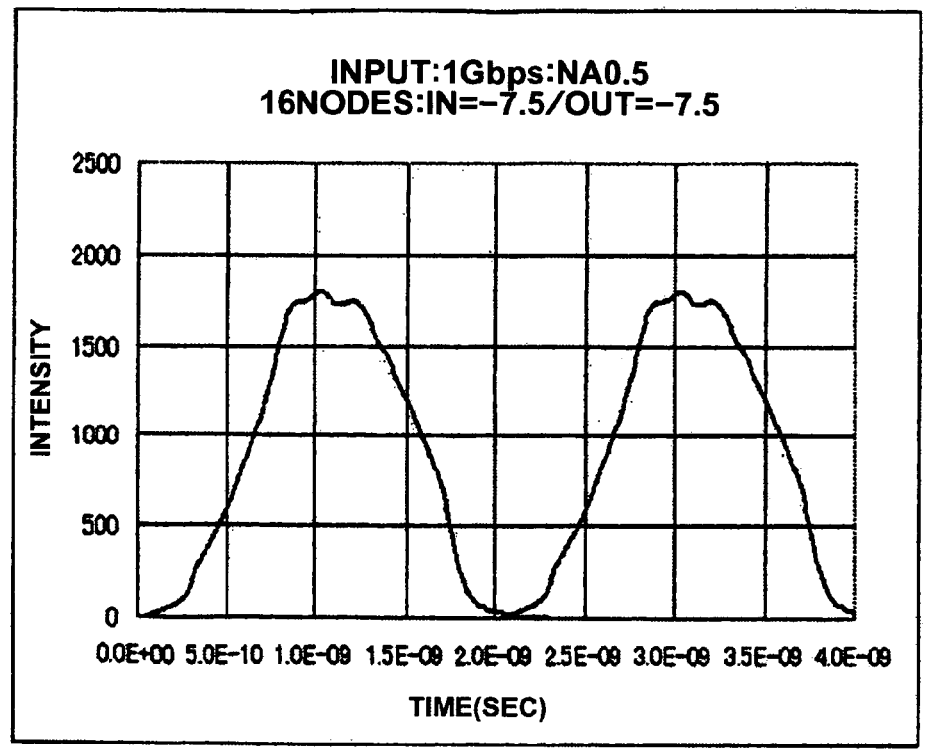
FIG. 15A is a graph showing an example of waveform distortion of signal light in a communication system using the sheet-shaped light guide, the number of nodes of which is 16.
Figure 15B:
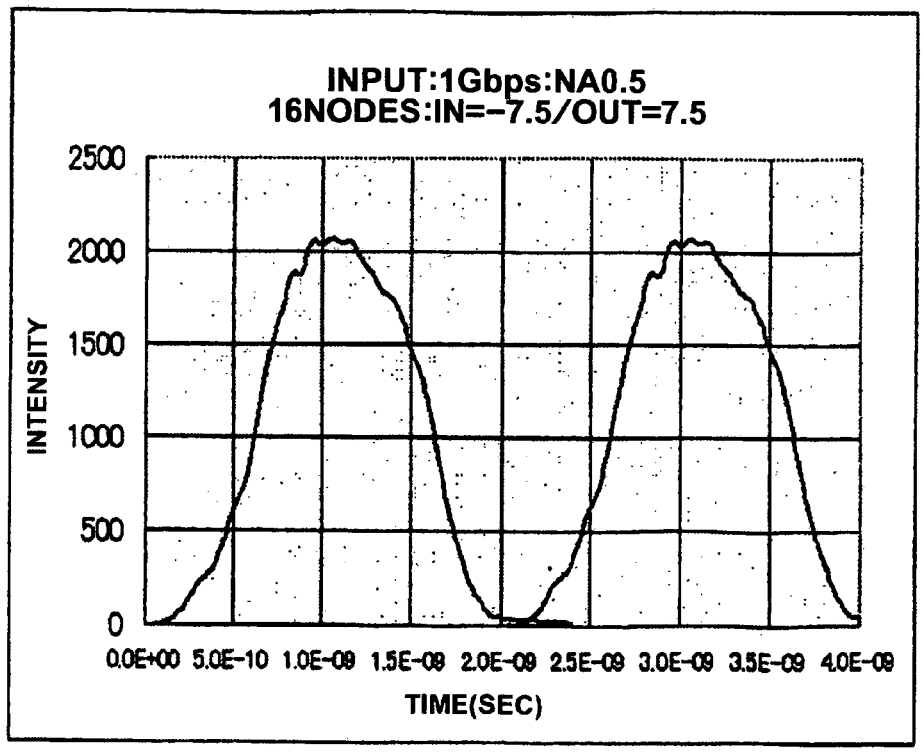
FIG. 15B is a graph showing another example of waveform distortion of signal light in the communication system using the sheet-shaped light guide, the number of nodes of which is 16.
Figure 16:
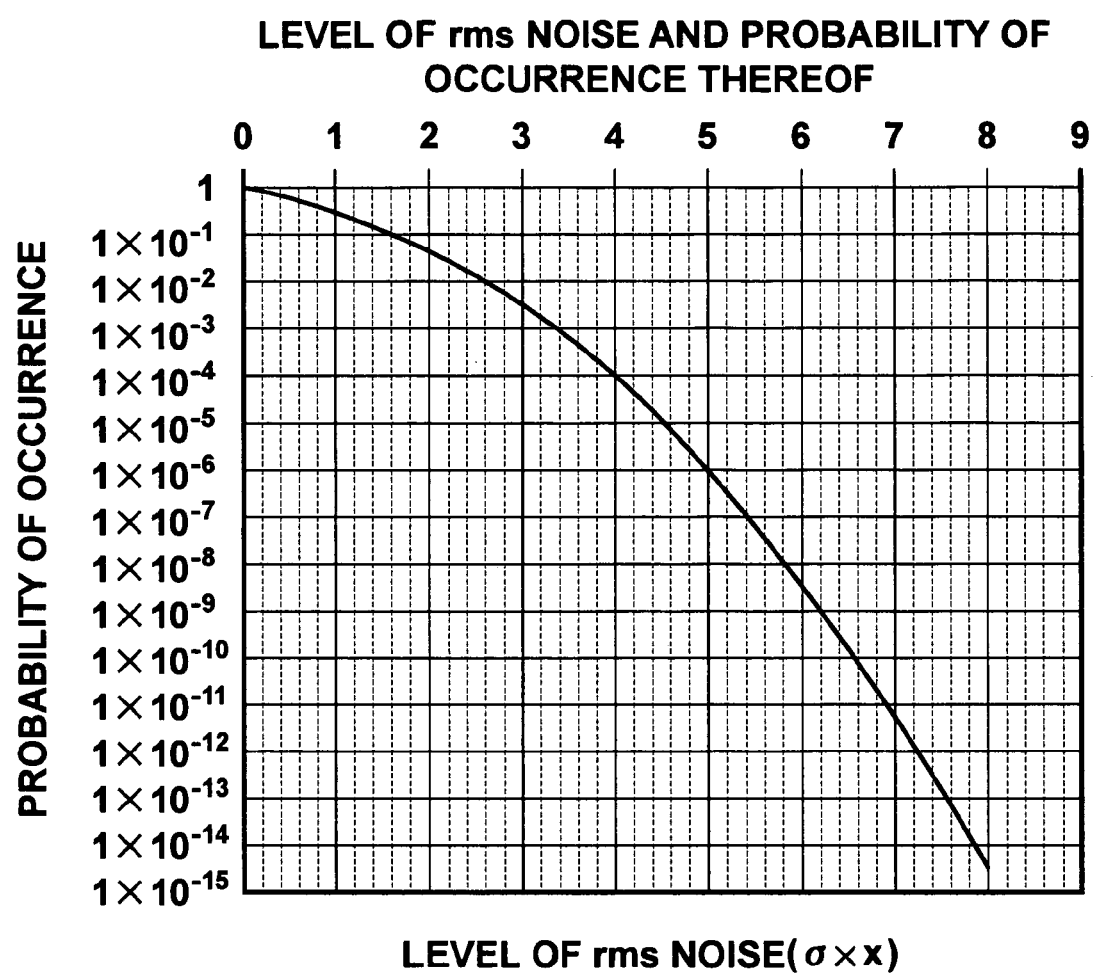
FIG. 16 is a graph showing the relationship between level of root mean square (rms) noise and probability of occurrence thereof.
Figure 18A:
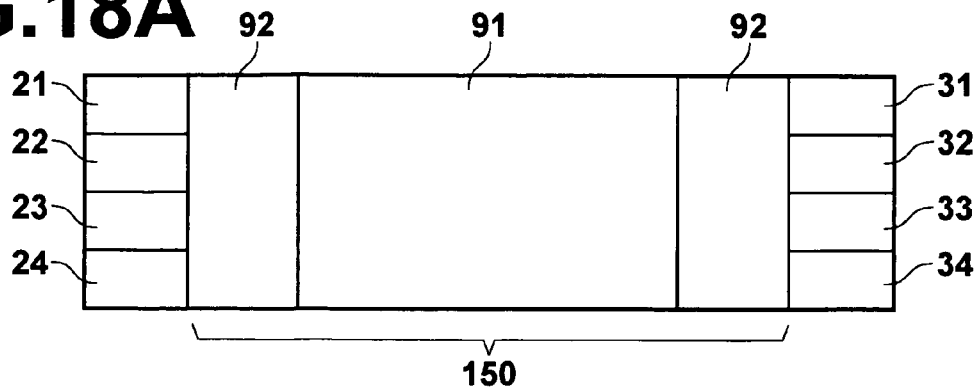
FIG. 18A is a plan view showing a communication system according to an embodiment of the present invention.
Figure 18B:
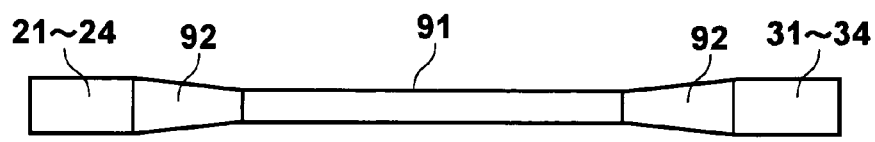
FIG. 18B is a side view showing the communication system according to the embodiment of the present invention.

FIGS. 18A and 18B show a communication system using a sheet-shaped light guide according to an embodiment of the present invention. FIGS. 18A and 18B respectively area plan view and a side view of a light guide 150 and the periphery thereof, which is used in the present embodiment. In the present embodiment as shown in these figures, the light guide 150 which is constituted of a sheet-shaped light guide 91 having basically the same composition as that of the sheet-shaped light guide 10 shown above in FIG. 10, and two tapered light guides 92 joined onto both end faces of the sheet-shaped light guide 91, is used. Optical fibers 21 to 24 are joined to one tapered light guide 92, and optical fibers 31 to 34 are similarly joined to the other tapered light guide 92.

As described above, the sheet-shaped light guide 91 includes particles for scattering light in an optical medium, such as PMMA (poly-methyl methacrylate), and propagates light incident from one end face of the light guide to the other end face side thereof while scattering the light by means of the particles.

As shown in FIG. 18B, the tapered light guides 92 are formed to have substantially the same thickness as those of the optical fibers 21 to 24, and 31 to 34, respectively, at the end portions thereof on the fiber sides. Moreover, the tapered light guides 92 are formed to have substantially the same thicknesses as that of the sheet-shaped light guide 91 at the end portions on the light guide side. In this manner, each tapered light guide 92 is formed to have a tapered shape in which the thickness varies between both end portions thereof. It should be noted that the tapered light guides 92 are basically composed similarly to the sheet-shaped light guide 91 except for the difference in shape, propagating light as described above.

For example, signal light emitted from a light emitter (not shown) coupled to one of the optical fibers 21 to 24 on the left side of the drawings propagates through the optical fiber, the tapered, light guide 92, the sheet-shaped light guide 91 and the other tapered light guide 92, and is received in parallel by, for example, light receivers (not shown) coupled to three of the optical fibers 31 to 34. A light emitter similar to that described above is coupled to the remaining one of the optical fibers 31 to 34, thereby enabling two-way communication.

The above optical fibers 21 to 24, and 31 to 34 have diameters larger than the thickness of the sheet-shaped light guide 91. Hence, when these optical fibers 21 to 24, and 31 to 34 are joined to the sheet-shaped light guide 91 individually, in order to ensure high coupling efficiency, it is desired that the thickness of the sheet-shaped light guide 91 be made larger to be brought into agreement with the core diameters of the optical fibers 21 to 24, and 31 to 34. However, such a thickly formed sheet-shaped light guide 91 becomes difficult to bend, and becomes difficult to dispose in a narrow and intricate space in an apparatus.

On the other hand, in the present embodiment, by providing such tapered light guides 92, the coupling efficiency between the sheet-shaped light guide 91 and each of the optical fibers 21 to 24, and 31 to 34 is kept high even if the sheet-shaped light guide 91 is not formed to be thick. Accordingly, by forming the sheet-shaped light guide 91 to be relatively thin in this manner, it is made possible to bend the sheet-shaped light guide 91 to some extent, and it becomes easy to dispose the light guide in a narrow space in an apparatus.

Accordingly, in place of a communication system using a flexible board or a flat cable which has been heretofore used for wiring in a narrow space in an apparatus, for example, the communication system of the present embodiment can be widely applied to such a purpose. In addition, this communication system not only can replace the above described conventional system, but also is not susceptible to electromagnetic noise as it communicates by optical signals.

It should be noted that the tapered light guide 92 may have basically the same composition as that of the sheet-shaped light guide 91 except that the tapered light guide 92 has a tapered shape. In addition, it is desirable that the angle of the taper be limited so as to satisfy the N.A. (numerical aperture) of incidence of the optical fiber joined.

Figure 19A:
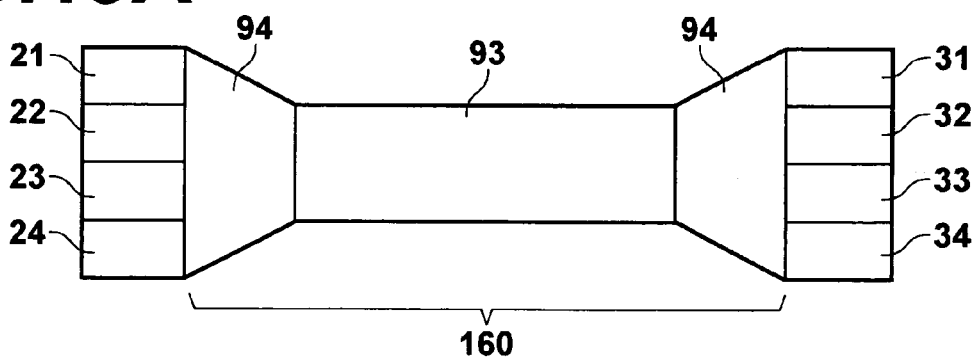
FIG. 19A is a plan view showing a communication system according to another embodiment of the present invention.
Figure 19B:
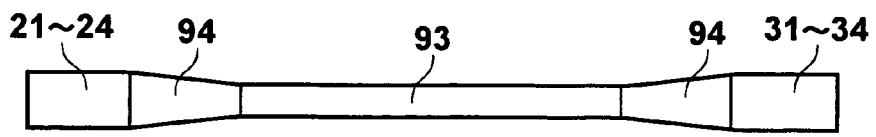
FIG. 19B is a side view showing the communication system according to another embodiment of the present invention.

Next, referring to FIGS. 19A and 19B, a description will be given of a communication system according to another embodiment of the present invention. FIGS. 19A and 19B respectively show a plan view and a side view of a light guide 160 and the periphery thereof, which is used in the present embodiment. In the present embodiment as shown in these figures, the shapes of the sheet-shaped light guide and the tapered light guides constituting the light guide 160 are different compared to those of the communication system shown in FIGS. 18A and 18B.

Specifically, in the present embodiment, a sheet-shaped light guide 93 which is relatively narrow in width is used, and each tapered light guide 94 has a shape tapered in width as well as in thickness. Also in such a configuration, effects similar to that of the communication system shown in FIGS. 18A and 18B can be obtained basically. In addition to the effects, this configuration has an advantage that it is easy to set the number of nodes to a large number even when a sheet-shaped light guide which is relatively narrow in width and an optical fiber which is relatively large in diameter are used.

What is claimed is:

1. A communication system using a sheet-shaped light guide, which comprises particles for scattering light in a sheet-shaped optical medium and propagates signal light incident from one end face of the sheet-shaped light guide to the other end face side thereof while scattering the light by means of the particles, wherein each end face of the sheet-shaped light guide is connected with a plurality of optical fibers, the outside diameter of each optical fiber is larger than the thickness of the sheet-shaped light guide, and the optical fibers and the sheet-shaped light guide are joined to each other with a single tapered light guide interposed therebetween, the tapered light guide becoming thinner from the optical fiber side thereof to the sheet-shaped light side thereof.

2. The communication system using the sheet-shaped light guide according to claim 1, wherein the thickness of the tapered light guide at the side on which the tapered light guide is joined to the sheet-shaped light guide and the thickness thereof at the side on which the tapered light guide is joined to the optical fibers are substantially equal to the thickness of the sheet-shaped light guide and the outside diameter of each optical fiber, respectively.

3. The communication system using the sheet-shaped light guide according to claim 1, wherein, when a scattering cross section of the particles is $\Phi$, a length of the optical medium in a light propagation direction is $L_G$, particle density is Np, and a correction coefficient is $K_C$, a value of $\Phi \cdot Np \cdot L_G \cdot K_C$ is 0.9 or less.

4. The communication system using the sheet-shaped light guide according to claim 2, wherein, when a scattering cross section of the particles is $\Phi$, a length of the optical medium in a light propagation direction is $L_G$, particle density is Np, and a correction coefficient is $K_C$, a value of $\Phi \cdot Np \cdot L_G \cdot K_C$ is 0.9 or less.

5. The communication system using the sheet-shaped light guide according to claim 3, wherein, when rms noise of the system is Noise(System_rms), an acceptable bit error rate is BER(accept), and a probability of occurrence of the Noise(System_rms) is Pr(Noise(System_rms)), the communication system satisfies:

$Pr(\text{Noise(System\_rms)} \cdot Q) \leq BER(\text{accept})$ where Q is a proportionality constant.

6. The communication system using the sheet-shaped light guide according to claim 4, wherein, when rms noise of the system is Noise(System_rms), an acceptable bit error rate is BER(accept), and a probability of occurrence of the Noise(System_rms) is Pr(Noise(System_rms)), the communication system satisfies:

$Pr(\text{Noise(System\_rms)} \cdot Q) \leq BER(\text{accept})$ where Q is a proportionality constant.

7. The communication system using the sheet-shaped light guide according to claim 3, wherein, when light emission efficiency Eout in the sheet-shaped light guide is represented as:

$Eout = \exp\{-(\Phi \cdot Np \cdot L_G \cdot K_C)\} \cdot K_L$, where $K_L$ is a loss coefficient obtained by aggregating internal transmissivity and the like of the sheet-shaped light guide, a minimum received optical power P(Receiver_min)dBm of a light receiver is represented as:

$P(\text{Receiver\_min})_{dBm} = -10 \log\{Pin \cdot Eout \cdot (NPi(\min)/\Sigma NPi) \cdot \pi/4\} \cdot K_T$ where Pin is received optical power, NPi(min) is optical power of a segment in which optical power becomes minimum, $\Sigma NPi$ is a sum of the optical power of respective segments, and $K_T$ is a coupling loss between a light emitter, optical fibers, a light receiver and the like, and a signal voltage determined from the minimum received optical power $P(\text{Receiver\_min})_{dBm}$ and a load resistor of a light receiver is S(PRmin)v, rms noise of the system is Noise(System_rms), and an arbitrary threshold value in binarization is V(Thresh), the communication system satisfies:

$\{S(PR\min)v - V(\text{Thresh})\} > \text{Noise(System\_rms)} \cdot Q.$

8. The communication system using the sheet-shaped light guide according to claim 4,
wherein, when light emission efficiency Eout in the sheet-shaped light guide is represented as:

$$Eout = \exp\{-(\Phi \cdot Np \cdot L_G \cdot K_C)\} \cdot K_L,$$

where $K_L$ is a loss coefficient obtained by aggregating internal transmissivity and the like of the sheet-shaped light guide,
a minimum received optical power P(Receiver_min)dBm of a light receiver is represented as:

$$P(\text{Receiver\_min})_{dBm} = -10 \, \text{Log}\{Pin \cdot Eout \cdot (NPi(\min)/\Sigma NPi) \cdot \pi/4\} \cdot K_T$$

where Pin is received optical power, NPi(min) is optical power of a segment in which optical power becomes minimum, $\Sigma NPi$ is a sum of the optical power of respective segments, and $K_T$ is a coupling loss between a light emitter, optical fibers, a light receiver and the like, and
a signal voltage determined from the minimum received optical power P(Receiver_min)$_{dBm}$ and a load resistor of a light receiver is S(PRmin)v, rms noise of the system is Noise(System_rms), and an arbitrary threshold value in binarization is V(Thresh),
the communication system satisfies:

$$\{S(PR\min)v - V(\text{Thresh})\} > \text{Noise}(\text{System\_rms}) \cdot Q.$$

9. The communication system using the sheet-shaped light guide according to claim 5,
wherein, when light emission efficiency Eout in the sheet-shaped light guide is represented as:

$$Eout = \exp\{-(\Phi \cdot Np \cdot L_G \cdot K_C)\} \cdot K_L,$$

where $K_L$ is a loss coefficient obtained by aggregating internal transmissivity and the like of the sheet-shaped light guide,
a minimum received optical power P(Receiver_min)dBm of a light receiver is represented as:

$$P(\text{Receiver\_min})_{dBm} = -10 \, \text{Log}\{Pin \cdot Eout \cdot (NPi(\min)/\Sigma NPi) \cdot \pi/4\} \cdot K_T$$

where Pin is received optical power, NPi(min) is optical power of a segment in which optical power becomes minimum, $\Sigma NPi$ is a sum of the optical power of respective segments, and $K_T$ is a coupling loss between a light emitter, optical fibers, a light receiver and the like, and
a signal voltage determined from the minimum received optical power P(Receiver_min)$_{dBm}$ and a load resistor of a light receiver is S(PRmin)v, rms noise of the system is Noise(System_rms), and an arbitrary threshold value in binarization is V(Thresh),
the communication system satisfies:

$$\{S(PR\min)v - V(\text{Thresh})\} > \text{Noise}(\text{System\_rms}) \cdot Q.$$

10. The communication system using the sheet-shaped light guide according to claim 6,
wherein, when light emission efficiency Eout in the sheet-shaped light guide is represented as:

$$Eout = \exp\{-(\Phi \cdot Np \cdot L_G \cdot K_C)\} \cdot K_L,$$

where $K_L$ is a loss coefficient obtained by aggregating internal transmissivity and the like of the sheet-shaped light guide,
a minimum received optical power P(Receiver_min)dBm of a light receiver is represented as:

$$P(\text{Receiver\_min})_{dBm} = -10 \, \text{Log}\{Pin \cdot Eout \cdot (NPi(\min)/\Sigma NPi) \cdot \pi/4\} \cdot K_T$$

where Pin is received optical power, NPi(min) is optical power of a segment in which optical power becomes minimum, $\Sigma NPi$ is a sum of the optical power of respective segments, and $K_T$ is a coupling loss between a light emitter, optical fibers, a light receiver and the like, and
a signal voltage determined from the minimum received optical power P(Receiver_min)$_{dBm}$ and a load resistor of a light receiver is S(PRmin)v, rms noise of the system is Noise(System_rms), and an arbitrary threshold value in binarization is V(Thresh),
the communication system satisfies:

$$\{S(PR\min)v - V(\text{Thresh})\} > \text{Noise}(\text{System\_rms}) \cdot Q.$$

11. The communication system using the sheet-shaped light guide according to claim 1,
wherein, when light incident on the sheet-shaped light guide is reflected repeatedly on respective faces other than incident and exit end faces according to Snell's Law, and when a refractive index of a surrounding medium is Ns, a refractive index of the optical medium as a base material is Nm, an incident angle is θm, and a refraction angle is θs, if Nm·sin θm = Ns·sin θs when the particles are not included, the sheet-shaped light guide comprises an optical medium of a shape satisfying sin θs > 1.

12. The communication system using the sheet-shaped light guide according to claim 2,
wherein, when light incident on the sheet-shaped light guide is reflected repeatedly on respective faces other than incident and exit end faces according to Snell's Law, and when a refractive index of a surrounding medium is Ns, a refractive index of the optical medium as a base material is Nm, an incident angle is θm, and a refraction angle is θs, if Nm·sin θm = Ns·sin θs when the particles are not included, the sheet-shaped light guide comprises an optical medium of a shape satisfying sin θs > 1.

13. The communication system using the sheet-shaped light guide according to claim 1,
wherein, when a light beam emitted from at least one exit end face of the sheet-shaped light guide obeys Snell's Law in reflection and refraction thereof on the exit end face, and when a refractive index of a surrounding medium is Ns, a refractive index of the optical medium as a base material is Nm, an incident angle is θm, and a refraction angle is θs, if Nm·sin θm = Ns·sin θs when the particles are not included, the sheet-shaped light guide comprises an optical medium of a shape satisfying sin θs < 1.

14. The communication system using the sheet-shaped light guide according to claim 2,
wherein, when a light beam emitted from at least one exit end face of the sheet-shaped light guide obeys Snell's Law in reflection and refraction thereof on the exit end face, and when a refractive index of a surrounding medium is Ns, a refractive index of the optical medium as a base material is Nm, an incident angle is θm, and a refraction angle is θs, if Nm·sin θm = Ns·sin θs when the particles are not included, the sheet-shaped light guide comprises an optical medium of a shape satisfying sin θs < 1.

15. The communication system using the sheet-shaped light guide according to claim 1,
wherein the optical medium of the sheet-shaped light guide comprises non-magnetic conductive particles which behave according to Mie scattering theory.

16. The communication system using the sheet-shaped light guide according to claim 2,
wherein the optical medium of the sheet-shaped light guide comprises non-magnetic conductive particles which behave according to Mie scattering theory.

17. The communication system using the sheet-shaped light guide according to claim 1,
wherein the optical medium of the sheet-shaped light guide comprises particles with a particle density that has a gradient.

18. The communication system using the sheet-shaped light guide according to claim 2,
wherein the optical medium of the sheet-shaped light guide comprises particles with a particle density that has a gradient.

19. The communication system using the sheet-shaped light guide according to claim 1, wherein the sheet-shaped light guide comprises a plurality of optical media.

20. The communication system using the sheet-shaped light guide according to claim 2, wherein the sheet-shaped light guide comprises a plurality of optical media.

* * * * *